(12) United States Patent
Shi

(10) Patent No.: US 12,554,376 B2
(45) Date of Patent: Feb. 17, 2026

(54) DISPLAY CONTROL METHOD AND APPARATUS, ELECTRONIC DEVICE, AND MEDIUM

(71) Applicant: VIVO MOBILE COMMUNICATION CO., LTD., Guangdong (CN)

(72) Inventor: Lixin Shi, Hangzhou (CN)

(73) Assignee: VIVO MOBILE COMMUNICATION CO., LTD., Guandong (CN)

( * ) Notice: Subject to any disclaimer, the term of this patent is extended or adjusted under 35 U.S.C. 154(b) by 160 days.

(21) Appl. No.: 18/390,393

(22) Filed: Dec. 20, 2023

(65) Prior Publication Data
US 2024/0126407 A1 Apr. 18, 2024

Related U.S. Application Data

(63) Continuation of application No. PCT/CN2022/100163, filed on Jun. 21, 2022.

(30) Foreign Application Priority Data

Jun. 25, 2021 (CN) .......................... 202110709943.1

(51) Int. Cl.
G06F 3/04817 (2022.01)
G06F 3/04842 (2022.01)

(52) U.S. Cl.
CPC ...... G06F 3/04817 (2013.01); G06F 3/04842 (2013.01)

(58) Field of Classification Search
CPC ............. G06F 3/04817; G06F 3/04842; G06F 3/0482; G06F 3/04883; G06F 3/04886
See application file for complete search history.

(56) References Cited

U.S. PATENT DOCUMENTS

| 2016/0004432 | A1* | 1/2016 | Bernstein | G06F 3/0481 715/769 |
| 2016/0156584 | A1* | 6/2016 | Hum | G06F 3/0482 715/752 |
| 2020/0341611 | A1* | 10/2020 | Xu | G06F 3/0488 |
| 2023/0262013 | A1 | 8/2023 | Wang | |

FOREIGN PATENT DOCUMENTS

| CN | 104866225 A | 8/2015 |
| CN | 109814774 A | 5/2019 |
| CN | 110637282 A | 12/2019 |
| CN | 111367450 A | 7/2020 |
| CN | 111488092 A | 8/2020 |
| CN | 111984162 A | 11/2020 |
| CN | 112351142 A | 2/2021 |
| CN | 113485593 A | 10/2021 |

* cited by examiner

Primary Examiner — Cao H Nguyen
(74) Attorney, Agent, or Firm — Price Heneveld LLP

(57) ABSTRACT

This application discloses a display control method and apparatus, an electronic device, and a medium, and belongs to the field of interface display technologies. The method includes: obtaining icon display information of a target application icon; and in a case that the icon display information is that the target application icon includes an extended display region, displaying target application information in the extended display region, where the target application information is application information of a target application corresponding to the target application icon; and the target application information includes at least one of the following: a function control, account information, and an unread message.

18 Claims, 9 Drawing Sheets

An electronic device obtains icon display information of a target application icon — 201

In a case that the icon display information is that the target application icon includes an extended display region, the electronic device displays the target application information in the extended display region — 202

DISPLAY CONTROL METHOD AND APPARATUS, ELECTRONIC DEVICE, AND MEDIUM

CROSS-REFERENCE TO RELATED APPLICATIONS

This application is a Bypass Continuation Application of PCT International Application No. PCT/CN2022/100163 filed on Jun. 21, 2022, which claims priority to Chinese Patent Application No. 202110709943.1, filed in China on Jun. 25, 2021, which are incorporated herein by reference in their entireties.

TECHNICAL FIELD

This application belongs to the field of interface display technologies, and specifically, relates to a display control method and apparatus, an electronic device, and a medium.

BACKGROUND

Currently, when a user needs to trigger an electronic device to perform a target operation on an application (for example, perform a target function in an application, run an application by using a target account, or view a message in the application), the user may perform an input on an application icon of the application on a desktop to trigger the electronic device to display an interface of the application, and subsequently perform a selection input to trigger the electronic device to perform the target operation.

However, in the foregoing method, each time the user triggers the electronic device to perform the target operation on the application, the user needs to first perform an input to trigger the electronic device to display the interface of the application, so that the user can perform a selection input to trigger the electronic device to perform the target operation. For example, in a case that the electronic device receives an unread message through the application, the user needs to first trigger the electronic device to display the interface of the application, and then perform an input on the unread message to trigger the electronic device to display an interface corresponding to the unread message, so as to view detailed information of the unread message. For another example, the application corresponds to a plurality of pieces of account information. When the user needs to trigger the electronic device to run the application by using a specific account, the user needs to first trigger the electronic device to display the interface of the application, and then select account information for log-in, so that the electronic device can be triggered to run the application by using the selected account information.

Therefore, when the user needs to trigger the electronic device to perform an operation on the application, an operation performed by the user is complex and time-consuming. As a result, efficiency of performing, by the electronic device, an operation on the application is low.

SUMMARY

According to a first aspect, an embodiment of this application aspect provides a display control method. The method includes: obtaining icon display information of a target application icon; and in a case that the icon display information is that the target application icon includes an extended display region, displaying target application information in the extended display region, where the target application information is application information of a target application corresponding to the target application icon; and the target application information includes at least one of the following: a function control, account information, and an unread message.

According to a second aspect, an embodiment of this application provides a display control apparatus. The apparatus includes: an obtaining module and a display module, where the obtaining module is configured to obtain icon display information of a target application icon; and the display module is configured to: in a case that the icon display information is that the target application icon includes an extended display region, display target application information in the extended display region, where the target application information is application information of a target application corresponding to the target application icon; and the target application information includes at least one of the following: a function control, account information, and an unread message.

According to a third aspect, an embodiment of this application provides an electronic device, where the electronic device includes a processor, a memory, and a program or instructions stored in the memory and capable of running on the processor, and when the program or instructions are executed by the processor, the steps of the method according to the first aspect are implemented.

According to a fourth aspect, an embodiment of this application provides a readable storage medium, where a program or instructions are stored in the readable storage medium, and when the program or instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions, to implement the method according to the first aspect.

DETAILED DESCRIPTION

Figure 1:
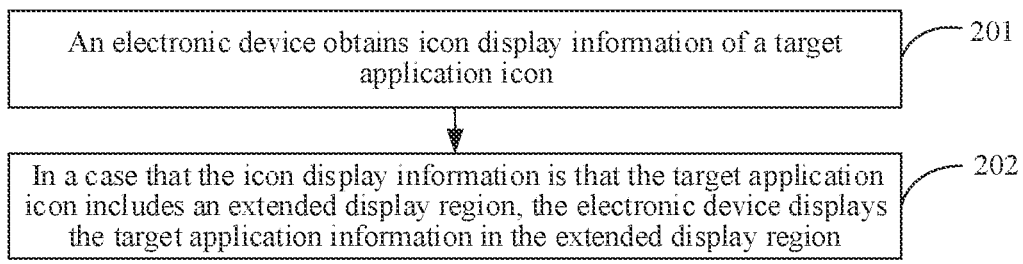
FIG. 1 is a schematic diagram 1 of a display control method according to an embodiment of this application.

The following clearly describes the technical solutions in the embodiments of this application with reference to the accompanying drawings in the embodiments of this application. Clearly, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects, but not to indicate a specific order or sequence. It should be understood that the data used in this way is interchangeable in appropriate circumstances, so that the embodiments of this application can be implemented in an order other than the order illustrated or described herein. In addition, the objects distinguished by "first", "second", and the like usually belong to one category, and the number of objects is not limited. For example, there may be one or more first objects. In addition, in the specification and claims, "and/or" represents at least one of connected objects, and the character "/" typically represents an "or" relationship between the associated objects. In the embodiments of this application, the term "a plurality of" means "at least two".

A display control method provided in the embodiments of this application is applied to a scenario of extending a function of an application icon. A specific application scenario may be determined according to an actual usage requirement, and is not specifically limited in this application.

An example of extending a function of an application icon displayed on a desktop of an electronic device is used for description. Assuming that a user needs to trigger the electronic device to display a function control, account information, an unread message, or the like of a target application by using an application icon, the electronic device may be triggered to increase a display size of the application icon. Therefore, in a case that the application icon includes an extended display region, the function control, the account information, the unread message, or the like can be displayed in the extended display region. For example, the user performs a touch-and-hold input on the application icon, and selects a surrounding region of the application icon, so that the electronic device can increase the display size of the application icon to cover a surrounding display region, and display a to-be-displayed content option on the application icon. In this way, corresponding content is displayed on the application icon (that is, the function control, the account information, the unread message, or the like is displayed) based on a choice by the user. Alternatively, in a case that the electronic device receives a notification message through an application corresponding to the application icon, the electronic device may increase the display size of the application icon to display the received notification message on the application icon. Therefore, the user can directly view corresponding content or perform a corresponding operation through the application icon.

Therefore, in the embodiments of this application, the electronic device may adjust a display size of a target application icon to display corresponding target application information on the target application icon, so as to facilitate quick interaction for the user and enrich functions of the application icon.

The following describes in detail a display control method provided in the embodiments of this application with reference to the accompanying drawings and by using specific embodiments and application scenarios thereof.

An embodiment of this application provides a display control method. FIG. 1 is a flowchart of a display control method according to an embodiment of this application. The method may be applied to a display control apparatus. As shown in FIG. 1, the display control method provided in this embodiment of this application may include the following step 201 and step 202.

Step 201: An electronic device obtains icon display information of a target application icon.

In this embodiment of this application, the electronic device may obtain the icon display information of the target application icon, and in a case that the icon display information is that the target application icon includes an extended display region, display, in the extended display region, a function control, account information, or an unread message of a target application corresponding to the target application icon.

Optionally, in this embodiment of this application, the electronic device detects display content on a screen to obtain the icon display information of the target application icon displayed on the screen.

Optionally, in this embodiment of this application, the icon display information of the target application icon is used for determining whether the target application icon includes an extended display region for displaying target application information.

Optionally, in this embodiment of this application, the target application icon is any application icon displayed on a desktop of the electronic device.

Step 202: In a case that the icon display information is that the target application icon includes an extended display region, the electronic device displays the target application information in the extended display region.

In this embodiment of this application, the target application information is application information of the target application corresponding to the target application icon; and the target application information includes at least one of the following: a function control, account information, and an unread message.

Optionally, in this embodiment of this application, the desktop of the electronic device includes a plurality of icon positions, and one application icon may be displayed in each icon position, or one application icon is displayed in a plurality of adjacent icon positions.

It can be understood that the desktop of the electronic device may include m×n icon positions, a display size of one icon position may be understood as 1×1, and a display size of one application icon may be any one of the following: 1×1, 1×2, 2×1, 2×2, and the like, that is, a display region corresponding to one application icon can include 1, 2, or 4 icon positions.

It should be noted that the desktop includes a plurality of icon positions, and the icon position is an icon display region for displaying an application icon with a default size (that is, an icon with a display size of 1×1). In a case that the electronic device displays an application icon with a default size, the application icon includes only an icon display region and does not include an extended display region, and the electronic device cannot display corresponding application information through the application icon.

Optionally, in this embodiment of this application, in a case that the target application icon includes an extended display region, the target application icon includes a plurality of icon positions, and the extended display region includes at least one icon position.

Optionally, in this embodiment of this application, the electronic device may display at least one of a function control, account information, and an unread message in the extended display region based on a choice by a user.

This embodiment of this application provides a display control method. An electronic device may obtain icon display information of a target application icon, and in a case that the icon display information is that the target application icon includes an extended display region, display, in the extended display region of the target application icon, a function control, account information, or an unread message of a target application corresponding to the target application icon. Based on a feature that a display size of a desktop application icon is variable, in a case that the target application icon includes the extended display region, the electronic device combines the application icon with the function control, the account information, or the unread message. In this way, in a case that the electronic device does not need to be triggered to display an application interface of a target application corresponding to the target application icon, a user can implement a corresponding function by performing an input on the target application information displayed in the extended display region of the target application icon. Therefore, based on display of application information corresponding to an application icon in an extended display region of the application icon, a function control in an application can be directly displayed, the user can also conveniently perform quick interaction, and display space of the application icon is also fully utilized, so that functions of the application icon can be enriched.

Figure 2:
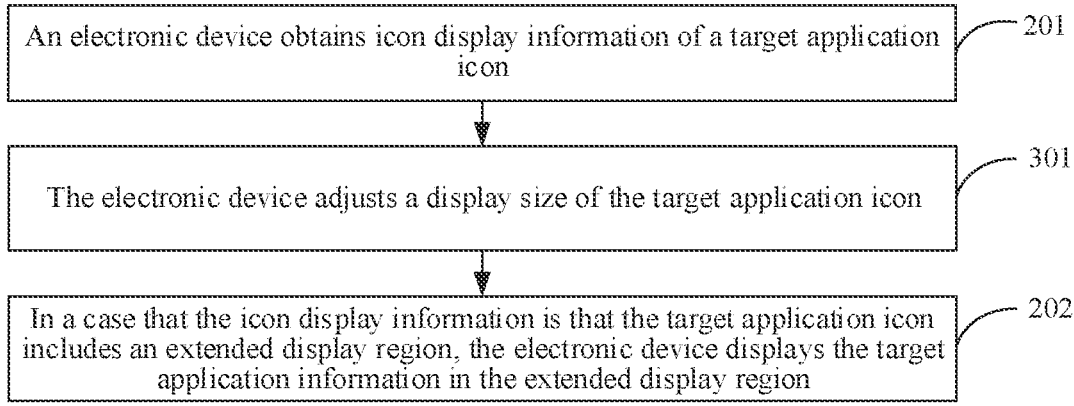
FIG. 2 is a schematic diagram 2 of a display control method according to an embodiment of this application.

Optionally, in this embodiment of this application, with reference to FIG. 1, as shown in FIG. 2, after step 201, the display control method provided in this embodiment of this application may further include the following step 301.

Step 301: The electronic device adjusts the display size of the target application icon.

In this embodiment of this application, the trigger condition for adjusting the display size of the target application icon includes: A first input performed by a user on the target application icon is received, where the first input is used for triggering an electronic device to adjust the display size of the target application icon; or the target application corresponding to the target application icon receives at least one notification message.

Optionally, in this embodiment of this application, in a case that the electronic device displays the target application icon in a first display region, if a trigger mode meets a preset condition, the electronic device adjusts the display size of the target application icon.

It should be noted that, in a case that the display size of the target application icon is less than a target display size, the electronic device may increase the display size of the target application icon based on the trigger mode; or in a case that the display size of the target application icon is greater than or equal to the target display size, the electronic device may decrease the display size of the target application icon based on the trigger mode.

Optionally, in this embodiment of this application, when the electronic device increases the display size of the target application icon based on the trigger mode, the electronic device may adjust a size of an application icon with a default size (that is, an icon with a display size of 1×1) to k (k is a positive integer greater than or equal to 2) times of the default size, for example, increase an icon with a display size of 1×1 to any one of the following: an icon with a display size of 1×2 (an area is twice the default size), an icon with a display size of 2×1 (an area is twice the default size), an icon with a display size of 2×2 (an area is 4 times of the default size), and the like. A size of an icon display region included in an adjusted target application icon is a display size of 1×1.

Optionally, in this embodiment of this application, the electronic device may alternatively adjust a size of an application icon with a default size (that is, an icon with a display size of 1×1) to 1.5 times of the default size based on the trigger mode, that is, enlarge an icon with a display size of 1×1 to an icon of 1×1.5. In this case, a size of the icon display region included in the target application icon is 1×1, a size of the extended display region included in the target application icon is 1×0.5, and an area of the extended display region is half of that of the target display region.

It should be noted that the electronic device may display the target application information in the extended display region in any one of the following manners based on an area size of an extended display region included in an adjusted target application icon: an information identifier, an information abbreviation, an information keyword, complete information, and the like.

Optionally, in this embodiment of this application, after the electronic device adjusts the display size of the target application icon, the target application icon includes an icon display region and an extended display region, to display an icon of the target application in the icon display region and display the target application information in the extended display region.

Optionally, in this embodiment of this application, the two steps of adjusting, by the electronic device, the display size of the target application icon and displaying the target application information in the extended display region may be performed sequentially or simultaneously. This is not limited in this application.

Optionally, in this embodiment of this application, a trigger mode for triggering the electronic device to adjust the display size of the target application icon may be: active triggering by the user through an input (to be specific, the first input performed by the user on the target application icon), or passive triggering when the electronic device receives a new message (to be specific, the electronic device receives a target notification message through the target application corresponding to the target application icon).

Optionally, in this embodiment of this application, the first input may be a touch-and-hold input performed by a user on the target application icon, to trigger the electronic device to perform an operation of adjusting the display size of the target application icon.

Optionally, in this embodiment of this application, in a case that the first display region corresponding to the target application icon is one icon position on the desktop, the electronic device may increase the display size of the target application icon, so that the target application icon can be displayed in a plurality of icon positions.

Optionally, in this embodiment of this application, in a case where the first display region corresponding to the target application icon is N icon positions on the desktop, the electronic device may increase or decrease the display size of the target application icon, so that the target application icon can be displayed in N+M icon positions, or the target application icon can be displayed in N−M icon positions, where both N and M are positive integers, and N is greater than M.

Optionally, in this embodiment of this application, the electronic device displays a target application icon with an increased display size in a second display region, and displays the target application information on the target application icon.

Optionally, in this embodiment of this application, the second display region includes the first display region, the second display region is a plurality of icon positions, and a display size of the second display region may be any one of the following: 1×2, 2×1, 2×2, and the like.

Optionally, in this embodiment of this application, the second display region may include an icon display region and an extended display region, and the extended display region may include a plurality of display sub-regions, the icon display region is used for displaying an icon of an application, and the extended display region is used for displaying the target application information.

An example in which the electronic device is a mobile phone is used for description. As shown in (A) in FIG. 3, the mobile phone displays a desktop 10, and the desktop 10 includes a plurality of display locations (namely, icon positions), to display an application icon in one display location, or display an enlarged application icon in a plurality of adjacent display locations. The desktop 10 includes a target application icon 11 (an example in which the desktop 10 includes only the target application icon 11 is used for description in this application, and the desktop 10 may alternatively include other application icons in an actual scenario), and the user may simultaneously perform an input on the target application icon 11 and a display location 12 adjacent to the right of the target application icon 11. As shown in (B) in FIG. 3, the mobile phone may enlarge and display the target application icon 11, and display the target application information on the target application icon 11.

Figure 3:
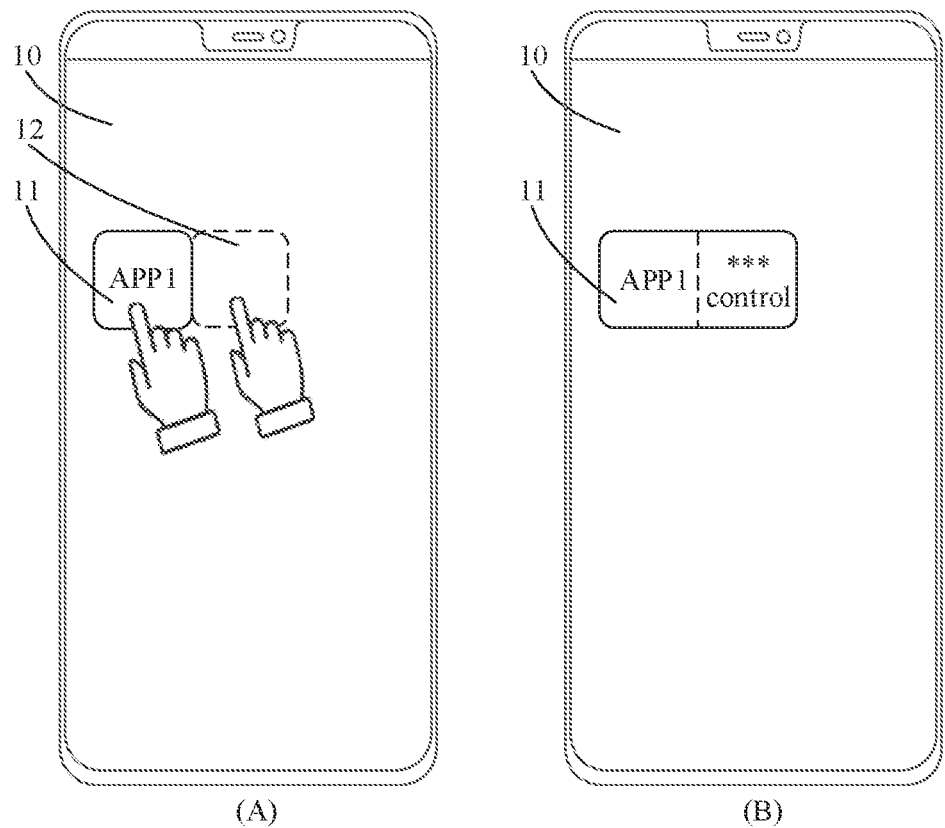
FIG. 3 is a schematic diagram 1 of an example interface of a mobile phone according to an embodiment of this application.
Figure 4:
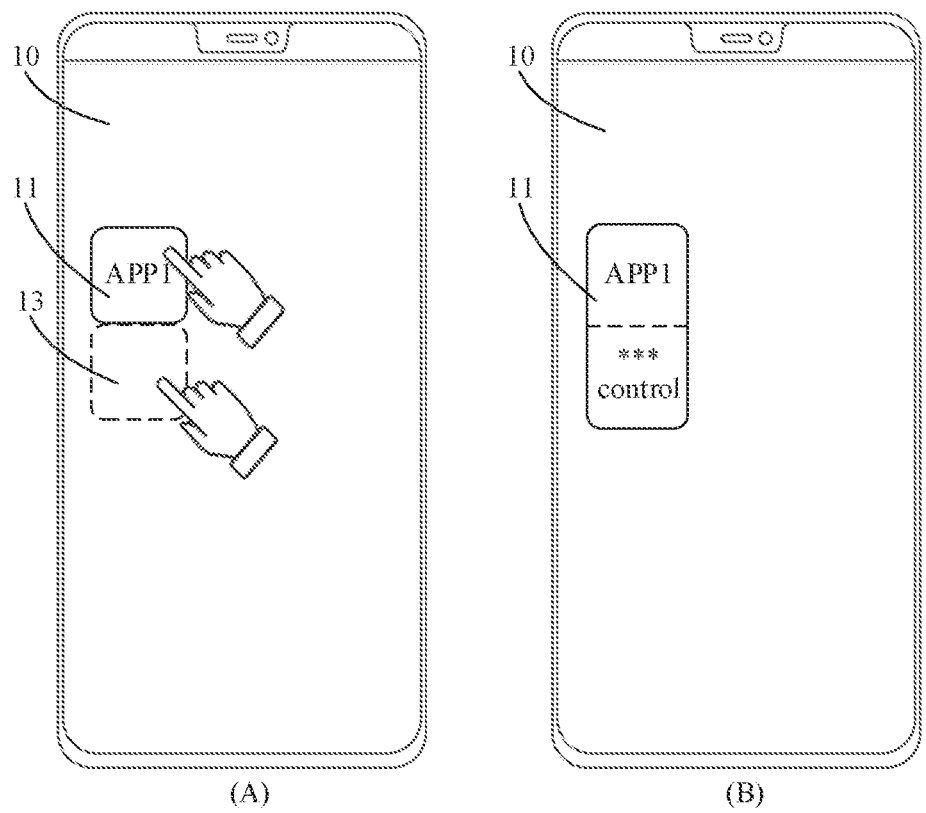
FIG. 4 is a schematic diagram 2 of an example interface of a mobile phone according to an embodiment of this application.

For example, with reference to (A) in FIG. 3, as shown in (A) in FIG. 4, the user may simultaneously perform an input on the target application icon 11 and a display location 13 adjacent to the bottom of the target application icon 11. As shown in (B) in FIG. 4, the mobile phone may enlarge and display the target application icon 11, and display the target application information on the target application icon 11.

Figure 5:
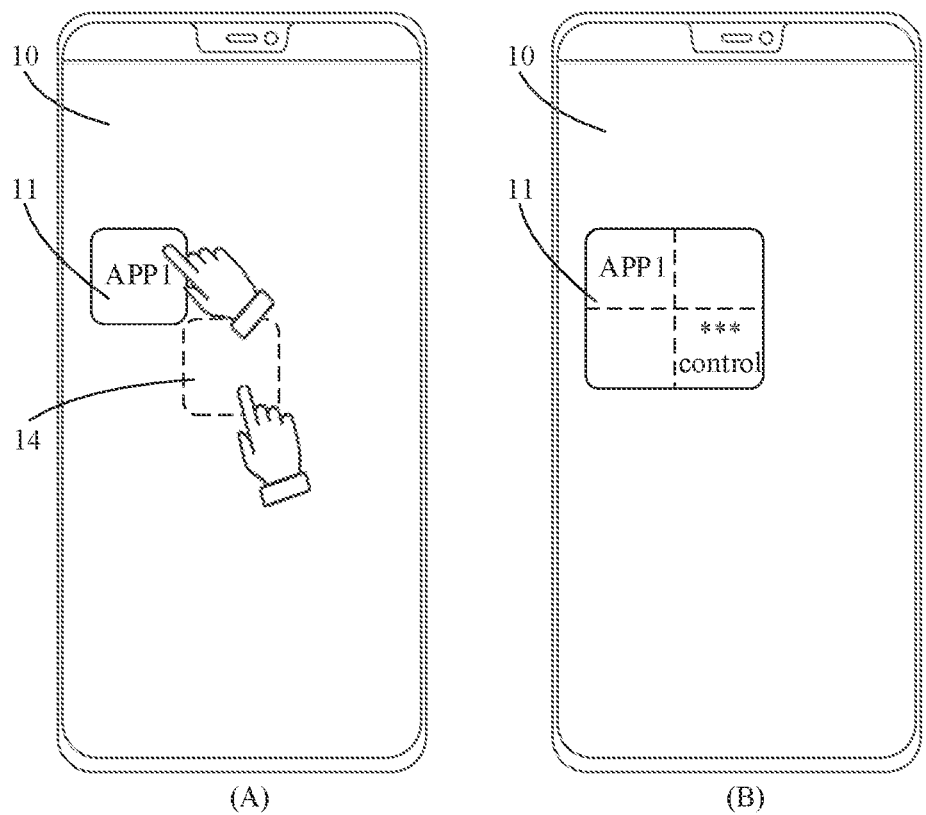
FIG. 5 is a schematic diagram 3 of an example interface of a mobile phone according to an embodiment of this application.

For example, with reference to (A) in FIG. 3, as shown in (A) in FIG. 5, the user may simultaneously perform an input on the target application icon 11 and a display location 14 that is diagonally adjacent to the target application icon 11. As shown in (B) in FIG. 5, the target application icon 11 may be enlarged and displayed, and the target application information is displayed on the target application icon 11.

It should be noted that, in a case that the display size of the target application icon is a display size of 4×4, the electronic device may alternatively shrink and display the target application icon based on an input performed by a user.

In this embodiment of this application, in a case that the user performs the first input on the target application icon displayed in the first display region, or the electronic device receives the target notification message through the target application corresponding to the target application icon, the electronic device may increase the display size of the target application icon displayed in the first display region, to display an enlarged target application icon in the second display region, so that the function control corresponding to the target application icon, the account information corresponding to the target application icon, or the unread message corresponding to the target application icon can be displayed on the target application icon with an increased display size. Based on a feature that a display size of a desktop application icon is variable, the user performs an input to trigger the electronic device to combine an original application icon with the function control and the account information, so that a function control in an application can be directly displayed through the target application icon, the user can also conveniently perform quick interaction, and display space of the application icon is also fully utilized, so that functions of the icon can be enriched.

Figure 6:
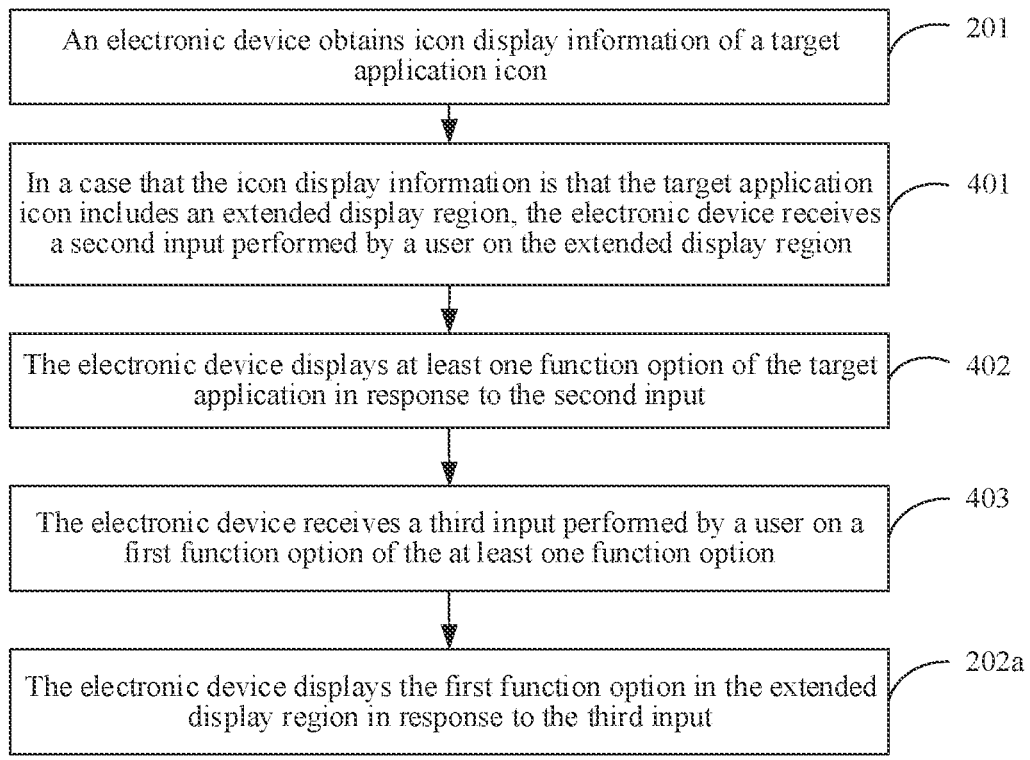
FIG. 6 is a schematic diagram 3 of a display control method according to an embodiment of this application.

Optionally, in this embodiment of this application, the target application information includes the function control. With reference to FIG. 1, as shown in FIG. 6, before the "displaying the target application information in the extended display region" in step 202, the display control method provided in this embodiment of this application may further include the following step 401 to step 403, and the "displaying the target application information in the extended display region" in step 202 may be specifically implemented by the following step 202a.

Step 401: In a case that the icon display information is that the target application icon includes the extended display region, the electronic device receives a second input performed by a user on the extended display region.

Step 402: The electronic device displays at least one function option of the target application in response to the second input.

Optionally, in this embodiment of this application, in a case that the user performs the first input on the target application icon to actively trigger the electronic device to increase the display size of the target application icon, the electronic device may display a target application icon with an increased display size in the second display region including the first display region.

Optionally, in this embodiment of this application, after displaying the target application icon with an increased display size, the electronic device may directly display the at least one function option corresponding to the target application icon, so that the user can perform a selection input, and the electronic device can determine and display the target application information (that is, display a first function option) on the target application icon.

Optionally, in this embodiment of this application, the electronic device may directly display, on the desktop in a floating manner, the at least one function option corresponding to the target application icon; or the electronic device may display a pop-up window on the desktop in a display form of a pop-up window, to display the at least one function option corresponding to the target application icon in the pop-up window.

Optionally, in this embodiment of this application, after the electronic device displays the target application icon with an increased display size, the user may alternatively perform an input to trigger the electronic device to display the at least one function option corresponding to the target application icon, and then perform a selection input to determine the target application information.

Optionally, in this embodiment of this application, the at least one of the function option is a function option corresponding to a function in the application corresponding to the target application icon, and the at least one function option may include at least one of the following: an Add Friend identifier, a Scan identifier, a Pay identifier, a Moments identifier, and the like. Identifiers in this application are used for indicating text, symbols, images, and the like of information, controls or other containers may be used as carriers for displaying information, and the identifiers include but are not limited to text identifiers, symbol identifiers, and image identifiers.

Step 403: The electronic device receives a third input performed by a user on the first function option of the at least one function option.

Step 202*a*: The electronic device displays the first function option in the extended display region in response to the third input.

Optionally, in this embodiment of this application, the electronic device determines the first function option as the target application information based on a selection input (namely, the third input) performed by the user.

Optionally, in this embodiment of this application, after the user performs a selection input on the first function option of the at least one function option, the electronic device may determine that the first function option is the target application information to be displayed in the extended display region.

Optionally, in this embodiment of this application, the first function option is used for triggering the electronic device to run a target function corresponding to the first function option, where the first function option is the at least one function option.

Optionally, in this embodiment of this application, the first function option may be a plurality of function options of the at least one function option, and the user may perform an input on the plurality of function options, so that the electronic device determines the plurality of function options as the target application information.

Optionally, in this embodiment of this application, in a case that a display size of the target application icon with an increased display size is 1×2 or 2×1, the first function option is one function option, and the electronic device displays the function option in the extended display region.

Optionally, in this embodiment of this application, in a case that a display size of the target application icon with an increased display size is 2×2, the first function option may be two or three function options, the extended display region includes three display sub-regions, and the electronic device may display the two (an empty display sub-region is included) or three function options in the three display sub-regions. One function option corresponds to one display sub-region.

Figure 7:
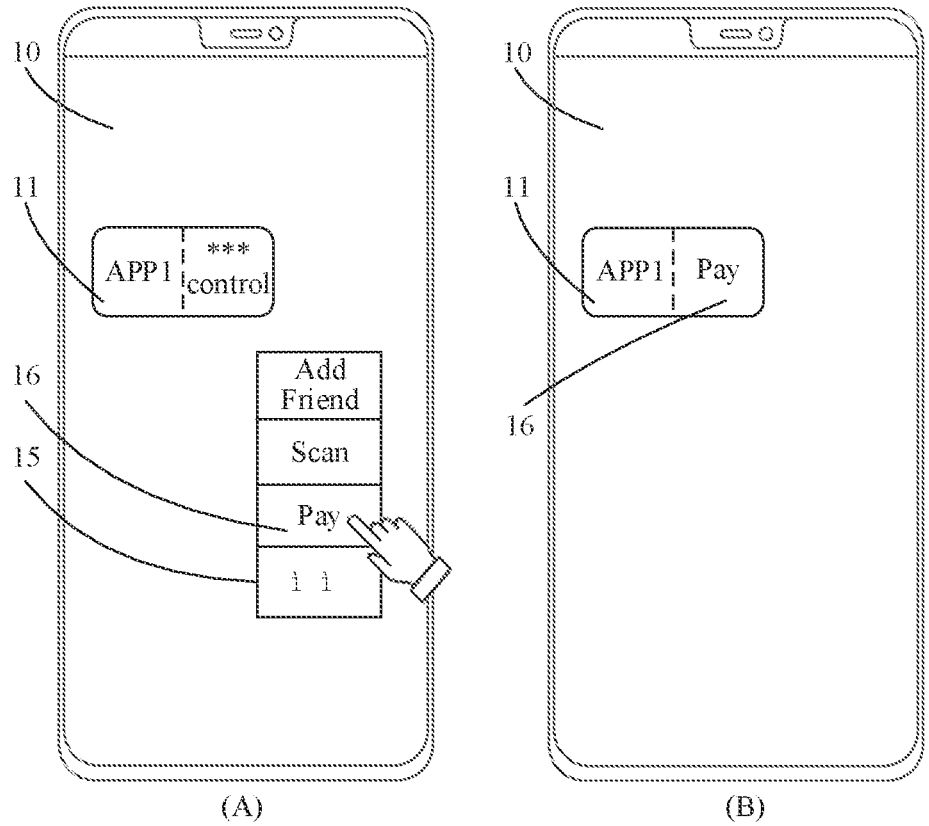
FIG. 7 is a schematic diagram 4 of an example interface of a mobile phone according to an embodiment of this application.

For example, with reference to (A) in FIG. 3, as shown in (A) in FIG. 7, in a case that the user simultaneously performs inputs on the target application icon 11 and the display location 12 adjacent to the right of the target application icon 11 to trigger the mobile phone to enlarge and display the target application icon 11, the mobile phone may display at least one function option 15 on the desktop 10 (or display a pop-up window on the desktop 10, and display the at least one function option 15 in the pop-up window), so that the user can perform a selection input on a first function option 16 of the at least one function option 15. As shown in (B) in FIG. 7, the mobile phone may determine the first function option 16 as the target application information, and display the first function option 16 on an enlarged and displayed target application icon 11.

It should be noted that, with reference to (A) in FIG. 5, in a case that the user simultaneously performs an input on the target application icon 11 and the display location 14 that is diagonally adjacent to the target application icon 11 to trigger the mobile phone to enlarge and display the target application icon 11, the user may perform an input on at least two function control identifiers of the at least one function option 15 displayed on the desktop 10, to display the at least two function control identifiers on an enlarged and displayed target application icon 11.

In this embodiment of this application, the user may perform an input on the extended display region before the target application information is displayed in the extended display region, to trigger the electronic device to display the at least one function option of the target application corresponding to the target application icon, so that the user can perform an input on the first function option of the at least one function option, and the electronic device determines the first function option selected by the user as the target application information to be displayed in the extended display region, and displays the first function option in the extended display region. Therefore, the user can directly perform an input on the first function option on the desktop to trigger the electronic device to run the target function corresponding to the first function option. This extends functions of an application icon displayed on the electronic device.

Figure 8:
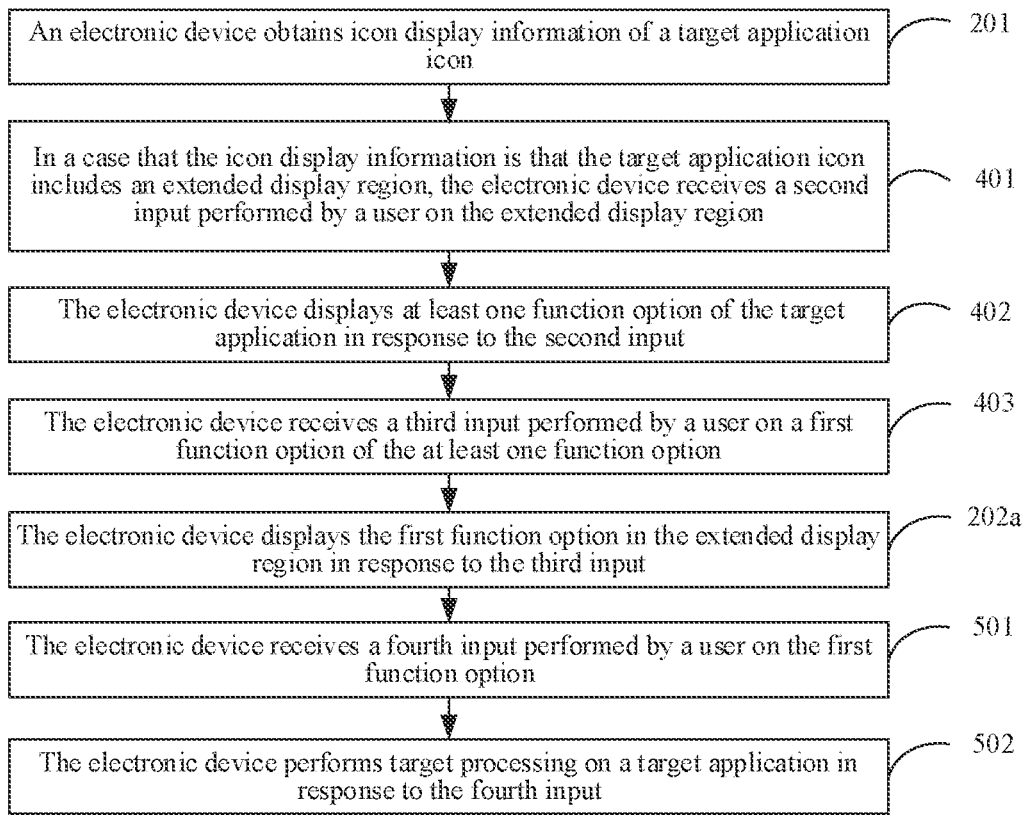
FIG. 8 is a schematic diagram 4 of a display control method according to an embodiment of this application.

Optionally, in this embodiment of this application, with reference to FIG. 6, as shown in FIG. 8, after step 202*a*, the display control method provided in this embodiment of this application may further include the following step 501 and step 502.

Step 501: The electronic device receives a fourth input performed by a user on the first function option.

Step 502: The electronic device performs target processing on the target application in response to the fourth input.

In this embodiment of this application, the target processing is processing indicated by the first function option.

Optionally, in this embodiment of this application, the processing indicated by the first function option may be understood as running the target function corresponding to the first function option.

Optionally, in this embodiment of this application, after the electronic device displays the first function option on the target application icon, in a case that the electronic device displays the desktop, a user may directly perform an input on the first function option displayed on the target application icon, and if the fourth input is a tap input performed by a user on the first function option, the electronic device may directly run the target function corresponding to the first function option.

For example, in a case that the first function option is "Scan", the electronic device may run a camera sensor and display an interface corresponding to "Scan" on a screen, so that the electronic device can recognize a two-dimensional code or a barcode; or in a case that the first function option is "Pay", the electronic device may display a payment code on the screen for performing payment.

Optionally, in this embodiment of this application, after step 202a, the display control method provided in this embodiment of this application may further include the following step 503 or step 504.

Step 503: In a case that a fifth input performed by a user on the extended display region is received, in response to the fifth input, the electronic device clears the first function option displayed in the extended display region.

Step 504: In a case that a sixth input performed by a user on the extended display region and a second function option of the at least one function option is received, in response to the sixth input, the electronic device replaces the first function option displayed in the extended display region with the second function option.

Optionally, in this embodiment of this application, in a case that an input performed by a user on the first function option is a touch-and-hold input, the electronic device may display, in a floating manner again, the at least one function option corresponding to the target application icon and a Clear identifier, and then the user may perform a selection input on the displayed at least one function option again, to trigger the electronic device to replace the first function option displayed on the target application icon. Alternatively, the user may perform an input on the Clear identifier to trigger the electronic device to clear the first function option displayed on the target application icon.

Figure 9:
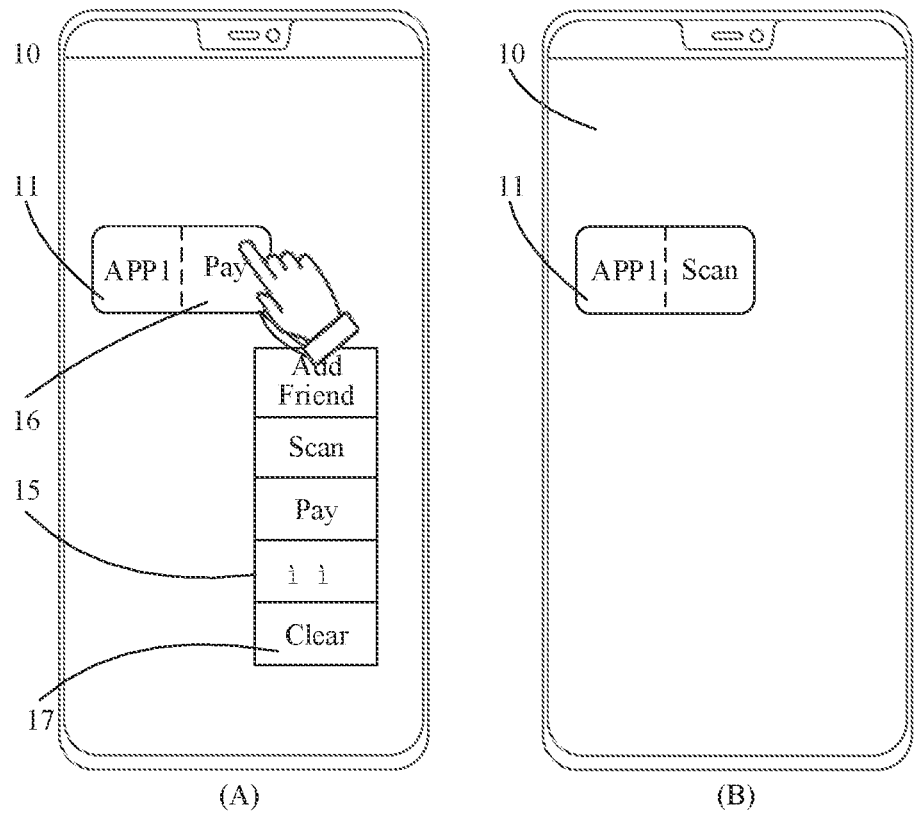
FIG. 9 is a schematic diagram 5 of an example interface of a mobile phone according to an embodiment of this application.

For example, with reference to (B) in FIG. 7, as shown in (A) in FIG. 9, after the mobile phone displays the first function option 16 on the enlarged and displayed target application icon 11, the user may perform a touch-and-hold input on the first function option 16 displayed on the target application icon 11 to trigger the mobile phone to display the at least one function option 15 again and display a Clear identifier 17. Therefore, the user may perform a selection input on the at least one function option 15 again, to re-determine target application information to be displayed on the target application icon. For example, the user may perform a selection input on the Scan identifier. As shown in (B) in FIG. 9, the mobile phone may replace the first function option 16 displayed on the target application icon 11 with the Scan identifier. Alternatively, the user may perform a selection input on the Clear identifier 17, and the mobile phone may clear the first function option 16 displayed on the target application icon 11 (that is, no target application information is displayed).

In this embodiment of this application, after the electronic device displays the first function option on the target application icon, the user may directly perform an input on the first function option displayed on the target application icon on the desktop. Therefore, based on different inputs, the electronic device may run the target function corresponding to the first function option, replace the first function option displayed on the target application icon, or clear the first function option displayed on the target application icon. In this way, the user can quickly trigger the electronic device to run the target function or adjust a function control identifier displayed on the target application icon. This improves flexibility of displaying the target application information on the target application icon.

Figure 10:
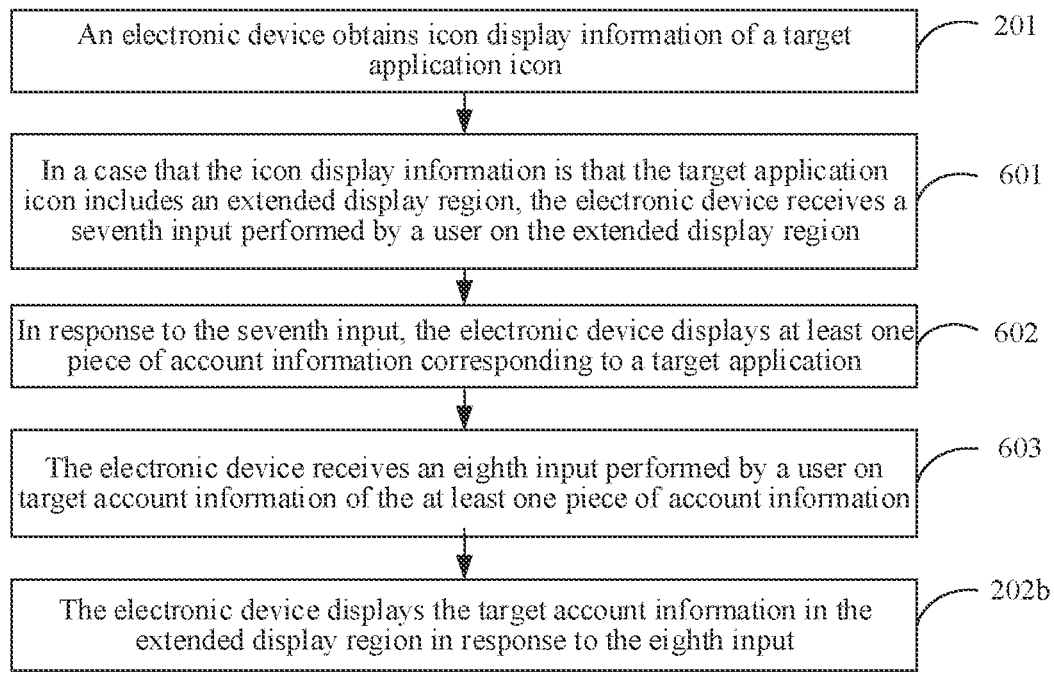
FIG. 10 is a schematic diagram 5 of a display control method according to an embodiment of this application.

Optionally, in this embodiment of this application, the target application information includes the account information. With reference to FIG. 1, as shown in FIG. 10, before the "displaying the target application information in the extended display region" in step 202, the display control method provided in this embodiment of this application may further include the following step 601 to step 603, and the "displaying the target application information in the extended display region" in step 202 may be specifically implemented by the following step 202b.

Step 601: In a case that the icon display information is that the target application icon includes the extended display region, the electronic device receives a seventh input performed by a user on the extended display region.

Step 602: In response to the seventh input, the electronic device displays at least one piece of account information corresponding to the target application.

Optionally, in this embodiment of this application, after displaying the target application icon with an increased display size, the electronic device may directly display the at least one piece of account information (namely, a plurality of login modes) corresponding to the target application icon, so that the user can perform a selection input, and the electronic device can determine and display the target application information (that is, display target account information) on the target application icon.

Optionally, in this embodiment of this application, after the electronic device displays the target application icon with an increased display size, the user may alternatively perform an input to trigger the electronic device to display the at least one piece of account information corresponding to the target application icon, and then perform a selection input to determine the target application information.

Optionally, in this embodiment of this application, the at least one piece of account information may be account information for logging in to the application corresponding to the target application icon, and the plurality of pieces of account information may include at least one of the following: a WeChat account, a mobile phone number, a QQ account, a Weibo account, and the like.

Step 603: The electronic device receives an eighth input performed by a user on target account information of the at least one piece of account information.

Step 202b: The electronic device displays the target account information in the extended display region in response to the eighth input.

Optionally, in this embodiment of this application, the electronic device may display the target account information and an account login record on the target application icon.

Optionally, in this embodiment of this application, the target account information may be a plurality of pieces of account information, and the target account information is used for triggering the electronic device to run the target application corresponding to the target application icon by using the target account information.

Optionally, in this embodiment of this application, after the user performs a selection input on the target account information of the plurality of pieces of account information, the electronic device may determine that the target account information is the target application information to be displayed on the target application icon.

Optionally, in this embodiment of this application, the target account information may be a plurality of pieces of account information of the at least one piece of account information, and the user may perform an input on the plurality of pieces of account information, so that the electronic device determines the plurality of pieces of account information as the target application information.

Optionally, in this embodiment of this application, in a case that a display size of the target application icon with an increased display size is 1×2 or 2×1, the target account information is one piece of account information, and the electronic device displays the account information in the extended display region.

Optionally, in this embodiment of this application, in a case that a display size of the target application icon with an increased display size is 2×2, the target account information may be two or three pieces of account information, the extended display region includes three display sub-regions, and the electronic device may display the two (an empty display sub-region is included) or three pieces of account information in the three display sub-regions. One piece of account information corresponds to one display region-region.

Figure 11:
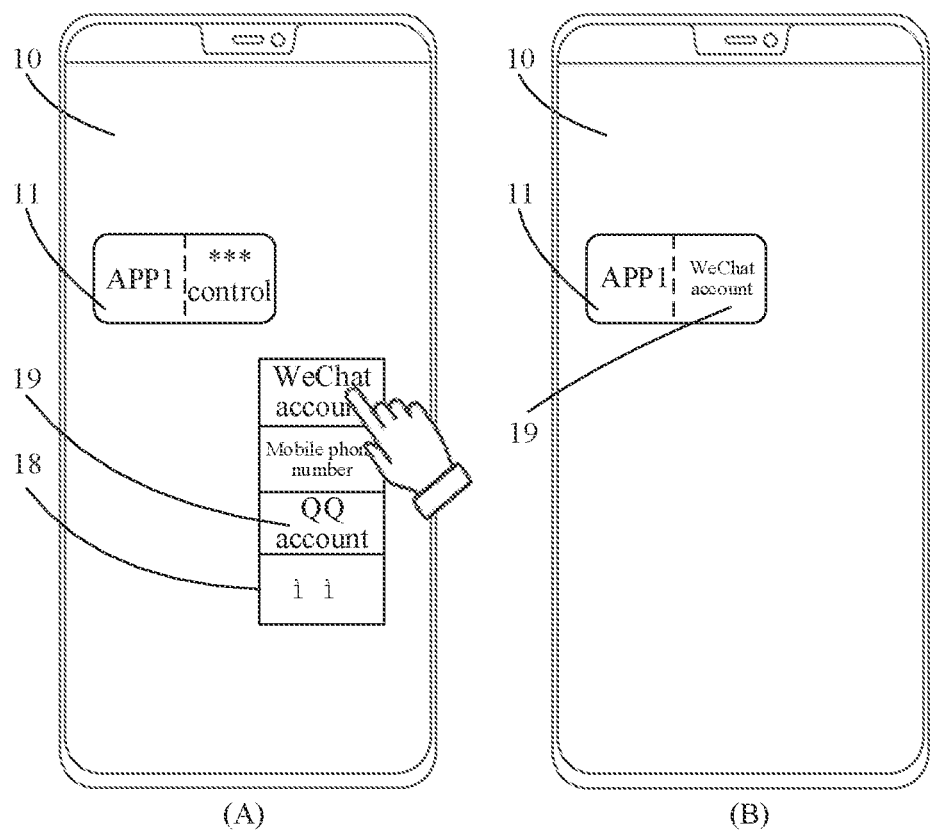
FIG. 11 is a schematic diagram 6 of an example interface of a mobile phone according to an embodiment of this application.

For example, with reference to (A) in FIG. 3, as shown in (A) in FIG. 11, in a case that the user simultaneously performs inputs on the target application icon 11 and the display location 12 adjacent to the right of the target application icon 11 to trigger the mobile phone to enlarge and display the target application icon 11, the mobile phone may display a plurality of pieces of account information 18 (for example, a WeChat account, a mobile phone number, and a QQ account) on the desktop 10, so that the user can perform a selection input on target account information 19 of the plurality of pieces of account information 18. As shown in (B) in FIG. 11, the mobile phone may determine the target account information 19 as the target application information, and display the target account information 19 on an enlarged and displayed target application icon 11.

It should be noted that, with reference to (A) in FIG. 5, in a case that the user simultaneously performs an input on the target application icon 11 and the display location 14 that is diagonally adjacent to the target application icon 11 to trigger the mobile phone to enlarge and display the target application icon 11, the user may perform an input on at least two pieces of account information of the plurality of pieces of account information 18 displayed on the desktop 10, to display the at least two pieces of account information on an enlarged and displayed target application icon 11.

In this embodiment of this application, the user may perform an input on the extended display region before the target application information is displayed in the extended display region, to trigger the electronic device to display the at least one piece of account information corresponding to the target application icon, so that the user can perform an input on the target account information of the at least one piece of account information, and the electronic device determines the target account information selected by the user as the target application information to be displayed on the target application icon, and displays the target account information and the account login record on the target application icon. Therefore, the user can directly perform an input on the target account information on the desktop to trigger the electronic device to directly run the target application corresponding to the target application icon by using the target account information. This increases a speed of running, by the electronic device, the target application corresponding to the target application icon.

Figure 12:
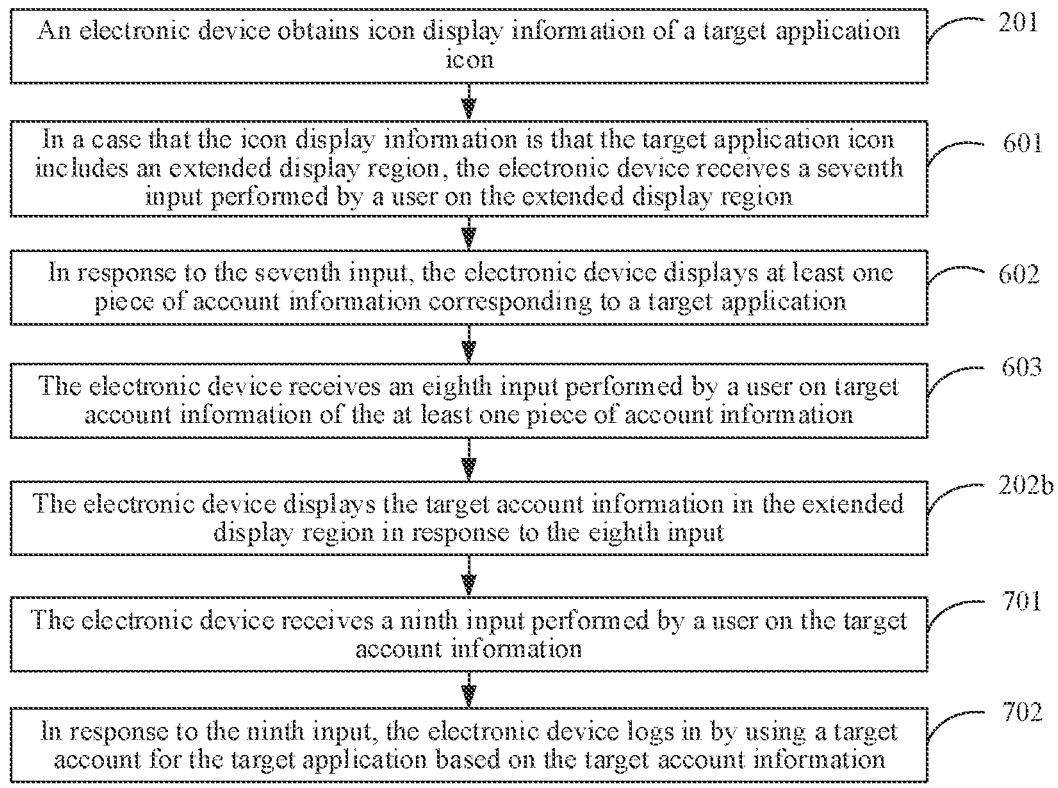
FIG. 12 is a schematic diagram 6 of a display control method according to an embodiment of this application.

Optionally, in this embodiment of this application, with reference to FIG. 10, as shown in FIG. 12, after step 202b, the display control method provided in this embodiment of this application may further include the following step 701 and step 702.

Step 701: The electronic device receives a ninth input performed by a user on the target account information.

Step 702: In response to the ninth input, the electronic device logs in by using a target account for the target application based on the target account information.

In this embodiment of this application, the target account is a login account associated with the target account information.

Optionally, in this embodiment of this application, after the electronic device displays the target account information on the target application icon, in a case that the electronic device displays the desktop, a user may directly perform an input on the target account information displayed on the target application icon, and if the ninth input is a tap input performed by a user on the target account information, the electronic device may directly run the application corresponding to the target application icon and log in by using the target account information.

Optionally, in this embodiment of this application, in a case that an input performed by a user on the target account information is a touch-and-hold input, the electronic device may display, in a floating manner again, the at least one piece of account information corresponding to the target application icon and a Clear identifier, and then the user may perform a selection input on the displayed at least one piece of account information again, to trigger the electronic device to replace the target account information displayed on the target application icon. Alternatively, the user may perform an input on the Clear identifier to trigger the electronic device to clear the target account information and the account login record displayed on the target application icon.

Figure 13:
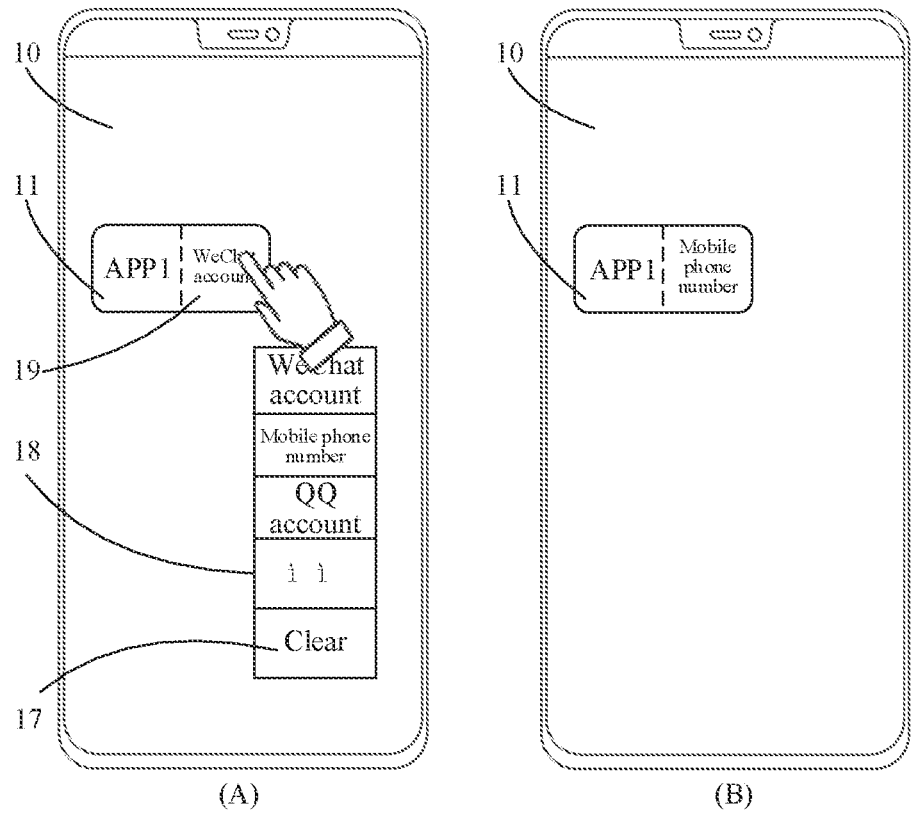
FIG. 13 is a schematic diagram 7 of an example interface of a mobile phone according to an embodiment of this application.

For example, with reference to (B) in FIG. 11, as shown in (A) in FIG. 13, after the mobile phone displays the target account information 19 on the enlarged and displayed target application icon 11, the user may perform a touch-and-hold input on the target account information 19 displayed on the target application icon 11 to trigger the mobile phone to display the plurality of pieces of account information 18 again and display a Clear identifier 17. Therefore, the user may perform a selection input on the plurality of pieces of account information 18 again, to re-determine target application information to be displayed on the target application icon. For example, the user may perform a selection input on the mobile phone number. As shown in (B) in FIG. 13, the mobile phone may replace the target account information 19 displayed on the target application icon 11 with the mobile phone number. Alternatively, the user may perform a selection input on the Clear identifier 17, and the mobile phone may clear the target account information 19 displayed on the target application icon 11 (that is, no target application information is displayed).

In this embodiment of this application, after the electronic device displays the target account information on the target application icon, the user may directly perform an input on the target account information displayed on the target application icon on the desktop. Therefore, based on different inputs, the electronic device may run the target application corresponding to the target application icon by using the target account information, replace the target account information displayed on the target application icon, or clear the target account information and the account login record displayed on the target application icon. In this way, the user can quickly trigger the electronic device to run the target application corresponding to the target application icon by using the target account information, or adjust account information displayed on the target application icon. This improves flexibility of displaying the target application information on the target application icon. In addition, the user can directly perform an operation on an extended display region of an application icon to implement one-tap login for different accounts without complex operations of first triggering the electronic device to enter an application interface and then selecting an account login option to select a login account, and the like. This can simplify an operation performed by the user.

Figure 14:
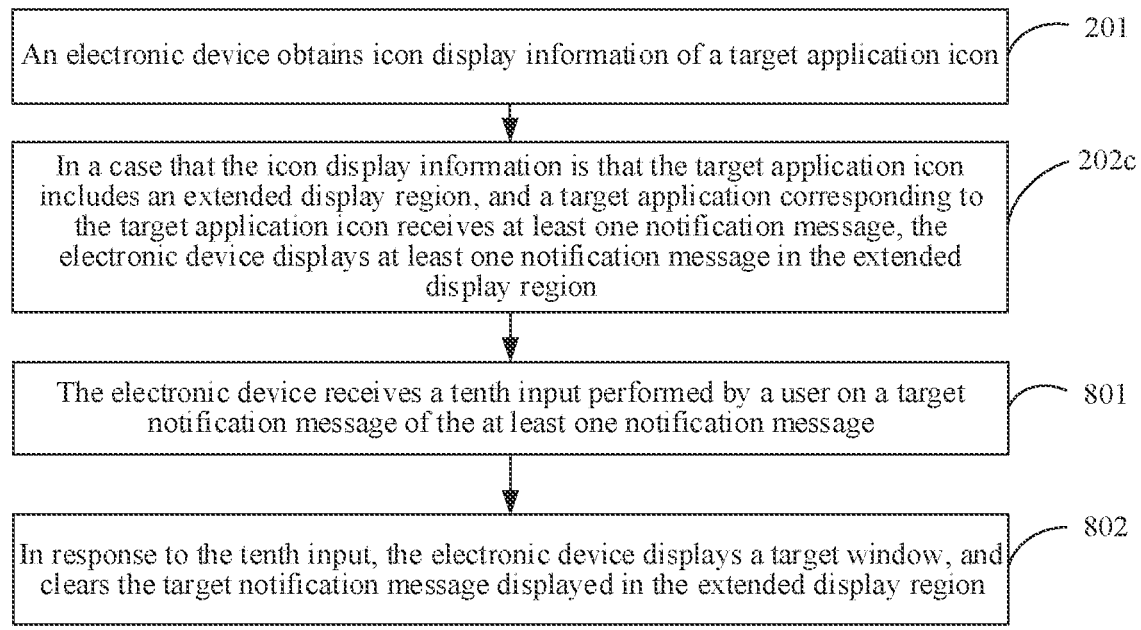
FIG. 14 is a schematic diagram 7 of a display control method according to an embodiment of this application.

Optionally, in this embodiment of this application, with reference to FIG. 1, as shown in FIG. 14, the target application information includes an unread message. Step 202 may be specifically implemented by the following step 202*c*, and after step 202, the display control method provided in this embodiment of this application may further include the following step 801 and step 802.

Step 202*c*: In a case that the icon display information is that the target application icon includes the extended display region, and the target application corresponding to the target application icon receives at least one notification message, the electronic device displays at least one notification message in the extended display region.

Optionally, in this embodiment of this application, after the electronic device displays the target application icon with an increased display size, in a case that the target application information (namely, the first function option or the target account information) is displayed on the target application icon, if the electronic device receives at least one notification message through the target application corresponding to the target application icon, the electronic device may display the at least one notification message on the target application icon to override the displayed target application information.

Optionally, in this embodiment of this application, the electronic device may alternatively display the at least one notification message in a notification bar to prompt the user to view the unread message in a timely manner.

Optionally, in this embodiment of this application, in a case that no target application information is displayed on the target application icon, if the electronic device receives at least one notification message through the target application corresponding to the target application icon, the electronic device may directly display the at least one notification message on the target application icon.

Optionally, in this embodiment of this application, the at least one notification message may include a plurality of unread messages, and the electronic device may display one unread message in each display sub-region included in the extended display region, or display the plurality of unread messages in one display sub-region in a scrolling manner in a case that the extended display region includes only one display sub-region.

Step 801: The electronic device receives a tenth input performed by a user on a target notification message of the at least one notification message.

Step 802: In response to the tenth input, the electronic device displays a target window, and clears the target notification message displayed in the extended display region.

In this embodiment of this application, the target window includes a target interface, and the target interface is an application interface including message content of the target notification message.

Optionally, in this embodiment of this application, after the electronic device displays the target notification message on the target application icon, the user may perform an input on the displayed target notification message to trigger the electronic device to display, in a display form of a display window, detailed information of the target notification message in a window.

Optionally, in this embodiment of this application, the electronic device displays a target interface of the target application in the target window to display the detailed information of the target notification message, may determine that the user has viewed the target notification message, and may cancel the display of the target notification message displayed on the target application icon.

Figure 15:
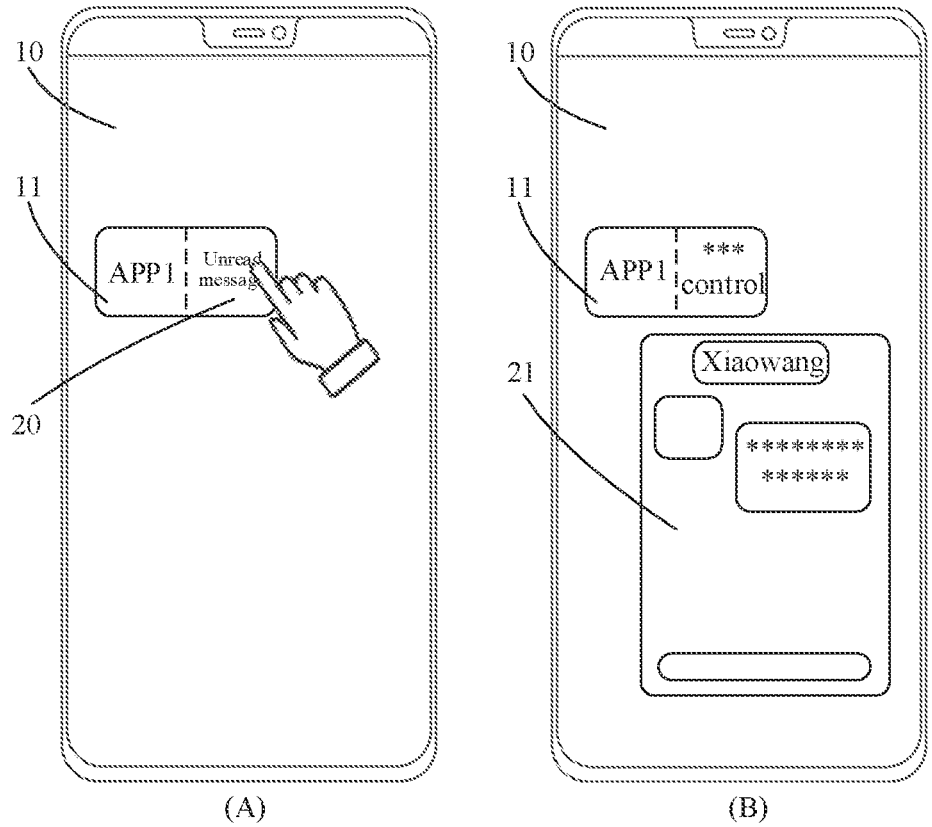
FIG. 15 is a schematic diagram 8 of an example interface of a mobile phone according to an embodiment of this application.

For example, with reference to (B) in FIG. 3, as shown in (A) in FIG. 15, in a case that the mobile phone receives a target unread message 20 through the target application corresponding to the target application icon 11, the mobile phone may display the target unread message 20 on the target application icon 11, and display the target unread message in a notification bar, so that the user can directly perform an input on the target unread message 20 displayed on the target application icon 11. As shown in (B) in FIG. 15, the mobile phone may display detailed information of the target unread message 20 in a display form of a floating window 21, and cancel the display of the target unread message 20 on the target application icon 11.

It should be noted that, in a case that the target unread message 20 received by the mobile phone through the target application corresponding to the target application icon 11 includes a plurality of unread messages, the mobile phone may display the unread messages on the target application icon 11 in a scrolling manner, or display the unread messages in order. With reference to (A) in FIG. 5, in a case that the user simultaneously performs an input on the target application icon 11 and the display location 14 that is diagonally adjacent to the target application icon 11 to trigger the mobile phone to enlarge and display the target application icon 11, the mobile phone may respectively display the unread messages in a plurality of display locations included in an enlarged and displayed target application icon 11 (that is, one unread message is displayed in one display location).

In this embodiment of this application, in a case that the electronic device receives the at least one notification message through the target application corresponding to the target application icon, the electronic device may display the at least one notification message in the extended display region of the target application icon. Therefore, in a case that the electronic device displays the desktop, the user can directly perform an input on the at least one notification message displayed in the extended display region, so that the electronic device can directly display the target window on the desktop and display detailed information of the at least one notification message in the target window, without first triggering the electronic device to display an interface of the target application and then displaying the detailed information of the target unread message. This improves efficiency of displaying the unread message by the electronic device.

Optionally, in this embodiment of this application, step 301 may be specifically implemented by the following step 301*a* and step 301*b*.

Step 301*a*: The electronic device detects whether icon positions adjacent to the target application icon include an empty icon position.

Step 301*b*: In a case that the icon positions adjacent to the target application icon include at least one empty icon position, the electronic device adjusts the display size of the target application icon based on a location of the empty icon position.

Optionally, in this embodiment of this application, the electronic device may recognize content displayed on the desktop to determine whether the icon positions adjacent to the target application icon (to be specific, above, under, on the left of, and on the right of the target application icon) include an empty icon position.

It should be noted that the empty icon position may be understood as a display region, on the screen, in which no application icon is displayed, and a size of the display region in which no application icon is displayed should be greater than or equal to the default size.

Optionally, in this embodiment of this application, in a case that the electronic device does not perform the first input on the target application icon to trigger the electronic device to increase the display size of the target application icon, if the electronic device receives the target unread message through the target application corresponding to the target application icon, the electronic device may first increase the display size of the target application icon, and then display the target unread message on the target application icon.

Optionally, in this embodiment of this application, in a case that the electronic device does not increase the display size of the target application icon, if the electronic device receives the target unread message through the target application corresponding to the target application icon, the electronic device first detects whether there is an empty icon position around the target application icon. If the electronic device detects that there is a vacant display location, namely, an empty icon position, around the target application icon, the electronic device may increase the display size of the target application icon.

It can be understood that, in a case that an application icon of an application is not enlarged by the user (that is, the application icon is normally displayed), if there is an empty icon position around the application icon, a size of the application icon is temporarily increased, and an unread message is displayed in both an extended region and a status bar. If there is no vacant display location around the application icon, the unread message is displayed only in the status bar.

Optionally, in this embodiment of this application, in a case that the electronic device increases the display size of the target application icon after receiving the target notification message through the target application corresponding to the target application icon, after the electronic device cancels the display of the target notification message displayed on the target application icon, the electronic device restores the display size of the target application icon to the default display size (that is, a display size of 1×1).

Optionally, in this embodiment of this application, in a case that a display size of an application icon of an application is greater than a preset display size, the electronic device may directly display an unread message in an extended display region included in the application icon.

In this embodiment of this application, before adjusting the display size of the target application icon, the electronic device may first detect whether the icon positions adjacent to the target application icon include an empty icon position, and in a case that the icon positions adjacent to the target application icon include an empty icon position, adjust the display size of the target application icon based on a display location of the empty icon position, so that whether the display size of the target application icon can be adjusted can be accurately determined.

Optionally, in this embodiment of this application, the icon display information is that the target application icon includes a first extended display region and a second extended display region, and the target application information includes first account information of a first account for the target application and second account information of a second account. Step 202b may be specifically implemented by the following step 202b1, and after step 202b, the display control method provided in this embodiment of this application may further include the following step 901.

Step 202b1: In response to the eighth input, the electronic device displays the first account information in the first extended display region, and displays the second account information in the second extended display region.

Step 901: In a case that a first message sent by a first contact associated with the first account information is received, and a second message sent by a second contact associated with the second account information is received, the electronic device displays the first message in the first extended display region, and displays the second message in the second extended display region.

In this embodiment of this application, the first extended display region is associated with the first account, and the second extended display region is associated with the second account.

Optionally, in this embodiment of this application, in a case that the extended display region includes a plurality of display sub-regions (that is, the first extended display region and the second extended display region), the first account information of the first account and the second account information of the second account for the target application may be displayed separately.

Optionally, in this embodiment of this application, in a case that the electronic device displays the first account information in the first extended display region and displays the second account information in the second extended display region, messages sent by contacts corresponding to the two pieces of account information (that is, the first account information and the second account information) may be received through the target application, and unread messages are displayed in corresponding extended display regions to prompt the user.

In this embodiment of this application, the electronic device may display the first account information in the first extended display region and display the second account information in the second extended display region. Therefore, in a case that the first message sent by the first contact associated with the first account information is received, and the second message sent by the second contact associated with the second account information is received, the electronic device may display the first message in the first extended display region, and display the second message in the second extended display region. Therefore, the electronic device can receive messages sent by contacts corresponding to two pieces of different account information through the target application, and prompt the user, so that efficiency of receiving unread messages by the electronic device can be improved.

It should be noted that the display control method provided in the embodiments of this application may be performed by a display control apparatus, or by a control module that is in the display control apparatus and that is configured to perform the display control method. In the embodiments of this application, a display control apparatus provided in the embodiments of this application is described by using an example in which the display control apparatus loads and performs the display control method.

Figure 16:
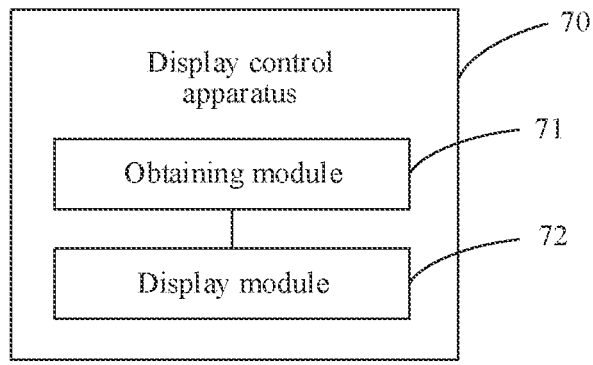
FIG. 16 is a schematic structural diagram 1 of a display control apparatus according to an embodiment of this application.

FIG. 16 is a schematic diagram of a possible structure of a display control apparatus according to an embodiment of this application. As shown in FIG. 16, the display control apparatus 70 may include: an obtaining module 71 and a display module 72.

The obtaining module 71 is configured to obtain icon display information of a target application icon. The display module 72 is configured to: in a case that the icon display information is that the target application icon includes an extended display region, display target application information in the extended display region, where the target application information is application information of a target application corresponding to the target application icon; and the target application information includes at least one of the following: a function control, account information, and an unread message.

Figure 17:
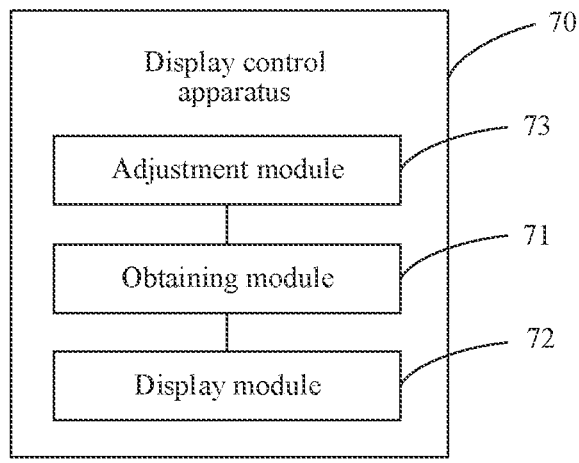
FIG. 17 is a schematic structural diagram 2 of a display control apparatus according to an embodiment of this application.

In a possible implementation, with reference to FIG. 16, as shown in FIG. 17, the display control apparatus 70 provided in this embodiment of this application may further include: an adjustment module 73. The adjustment module 73 is configured to: after the obtaining module 71 obtains the icon display information of the target application icon, adjust a display size of the target application icon. A trigger condition for adjusting the display size of the target application icon includes: A first input performed by a user on the target application icon is received, where the first input is used for triggering an electronic device to adjust the display size of the target application icon; or the target application corresponding to the target application icon receives at least one notification message.

Figure 18:
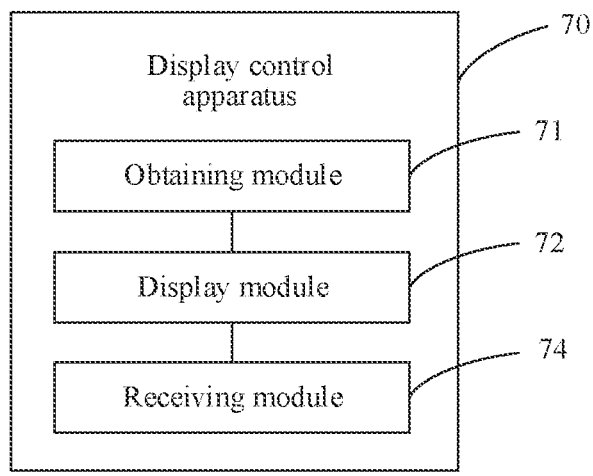
FIG. 18 is a schematic structural diagram 3 of a display control apparatus according to an embodiment of this application.

In a possible implementation, the target application information includes the function control. With reference to FIG. 16, as shown in FIG. 18, the display control apparatus 70 provided in this embodiment of this application may further include: a receiving module 74. The receiving module 74 is configured to: before the display module 72 displays the target application information in the extended display region, receive a second input performed by a user on the extended display region. The display module 72 is further configured to display at least one function option of the target application in response to the second input received by the receiving module 74. The receiving module 74 is further configured to receive a third input performed by a user on a first function option of the at least one function option. The display module 72 is specifically configured to display the first function option in the extended display region in response to the third input received by the receiving module 74.

Figure 19:
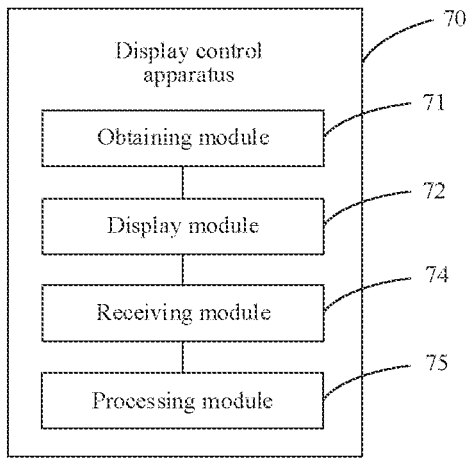
FIG. 19 is a schematic structural diagram 4 of a display control apparatus according to an embodiment of this application.

In a possible implementation, the receiving module 74 is further configured to: after the display module 72 displays the target application information in the extended display region, receive a fourth input performed by a user on the first function option. With reference to FIG. 18, as shown in FIG. 19, the display control apparatus 70 provided in this embodiment of this application may further include: a processing module 75. The processing module 75 is configured to perform target processing on the target application in response to the fourth input received by the receiving module 74, where the target processing is processing indicated by the first function option.

In a possible implementation, the display module 72 is further configured to: after displaying the target application information in the extended display region, in a case that a fifth input performed by a user on the extended display region is received, in response to the fifth input, clear the first function option displayed in the extended display region; and the display module 72 is further configured to: in a case that a sixth input performed by a user on the extended display region and a second function option of the at least one function option is received, in response to the sixth input, replace the first function option displayed in the extended display region with the second function option.

In a possible implementation, the target application information includes the account information. As shown in FIG. 18, the display control apparatus 70 provided in this embodiment of this application may further include: a receiving module 74. The receiving module 74 is configured to: before the display module 72 displays the target application information in the extended display region, receive a seventh input performed by a user on the extended display region. The display module 72 is further configured to: in response to the seventh input received by the receiving module 74, display at least one piece of account information corresponding to the target application. The receiving module 74 is further configured to receive an eighth input performed by a user on target account information of the at least one piece of account information. The display module 72 is specifically configured to display the target account information in the extended display region in response to the eighth input.

In a possible implementation, the receiving module 74 is further configured to: after the display module 72 displays the target application information in the extended display region, receive a ninth input performed by a user on the target account information. The display control apparatus 70 provided in this embodiment of this application may further include: a login module. The login module is configured to: in response to the ninth input received by the receiving module 74, log in by using a target account for the target application based on the target account information, where the target account is a login account associated with the target account information.

In a possible implementation, the target application information includes the unread message. The display module 72 is specifically configured to: in a case that the target application corresponding to the target application icon receives at least one notification message, display the at least one notification message in the extended display region. As shown in FIG. 18, the display control apparatus 70 provided in this embodiment of this application may further include: a receiving module 74. The receiving module 74 is configured to: after the display module 72 displays the target application information in the extended display region, receive a tenth input performed by a user on a target notification message of the at least one notification message. The display module 72 is further configured to: in response to the tenth input received by the receiving module 74, display a target window, and clear the target notification message displayed in the extended display region, where the target window includes a target interface, and the target interface is a program interface including message content of the target notification message.

In a possible implementation, the adjustment module 73 is specifically configured to: detect whether icon positions adjacent to the target application icon include an empty icon position; and in a case that the icon positions adjacent to the target application icon include at least one empty icon position, adjust the display size of the target application icon based on a location of the empty icon position.

In a possible implementation, the icon display information is that the target application icon includes a first extended display region and a second extended display region, and the target application information includes first account information of a first account for the target application and second account information of a second account. The display module 72 is specifically configured to display the first account information in the first extended display region, and display the second account information in the second extended display region. The display module 72 is further configured to: after displaying the target account information in the extended display region, in a case that a first message sent by a first contact associated with the first account information is received, and a second message sent by a second contact associated with the second account information is received, display the first message in the first extended display region, and display the second message in the second extended display region, where the first extended display region is associated with the first account, and the second extended display region is associated with the second account.

The display control apparatus provided in this embodiment of this application is capable of implementing the processes implemented by the display control apparatus in the method embodiments. To avoid repetition, details are not described herein again.

This embodiment of this application provides a display control apparatus. An electronic device may obtain icon display information of a target application icon, and in a case that the icon display information is that the target application icon includes an extended display region, display, in the extended display region of the target application icon, a function control, account information, or an unread message of a target application corresponding to the target application icon. Based on a feature that a display size of a desktop application icon is variable, in a case that the target application icon includes the extended display region, the electronic device combines the application icon with the function control, the account information, or the unread message. In this way, in a case that the electronic device does not need to be triggered to display an application interface of a target application corresponding to the target application icon, a user can implement a corresponding function by performing an input on the target application information displayed in the extended display region of the target application icon. Therefore, based on display of application information corresponding to an application icon in an extended display region of the application icon, a function control in an application can be directly displayed, the user can also conveniently perform quick interaction, and display space of the application icon is also fully utilized, so that functions of the application icon can be enriched.

The display control apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, or a self-service machine. This is not specifically limited in this embodiment of this application.

The display control apparatus in this embodiment of this application may be an apparatus with an operating system. The operating system may be an Android operating system, an iOS operating system, or other possible operating systems, which is not specifically limited in the embodiments of the present invention.

Figure 20:
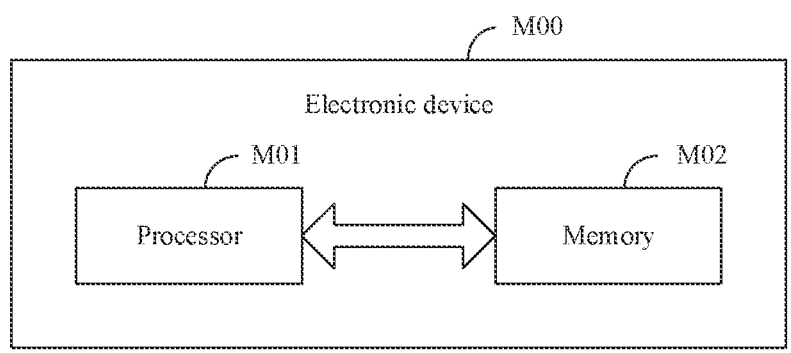
FIG. 20 is a schematic structural diagram of an electronic device according to an embodiment of this application.

Optionally, as shown in FIG. 20, an embodiment of this application further provides an electronic device M00, including a processor M01, a memory M02, and a program or instructions stored in the memory M02 and capable of running on the processor M01. When the program or instructions are executed by the processor M01, the processes of the foregoing display control method embodiments are implemented, with the same technical effects achieved. To avoid repetition, details are not described herein again.

It should be noted that the electronic device in this embodiment of this application includes the foregoing mobile electronic device and non-mobile electronic device.

Figure 21:
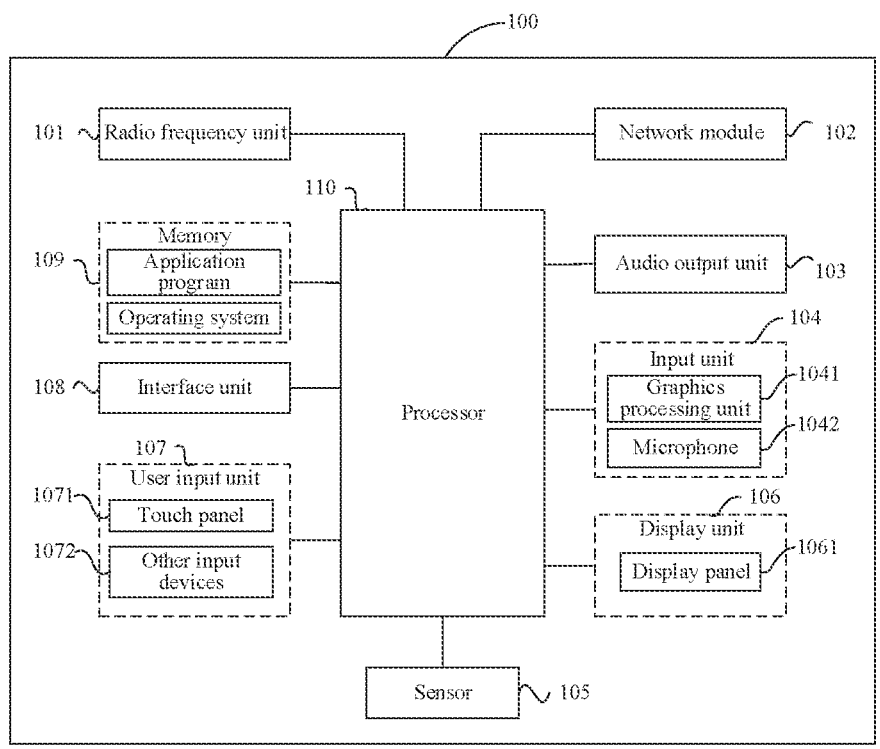
FIG. 21 is a schematic diagram of a hardware structure of an electronic device according to an embodiment of this application.

FIG. 21 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (for example, a battery) that supplies power to various components. The power supply may be logically connected to the processor 110 through a power management system, so that functions such as charge and discharge management and power consumption management are implemented by using the power management system. The structure of the electronic device shown in FIG. 21 does not constitute a limitation on the electronic device. The electronic device may include more or fewer components than those shown in the figure, or some components may be combined, or there may be a different component layout. Details are not described herein again.

The processor 110 is configured to obtain icon display information of a target application icon.

The display unit 106 is configured to: in a case that the icon display information is that the target application icon includes an extended display region, display target application information in the extended display region, where the target application information is application information of a target application corresponding to the target application icon; and the target application information includes at least one of the following: a function control, account information, and an unread message.

This embodiment of this application provides an electronic device. The electronic device may obtain icon display information of a target application icon, and in a case that the icon display information is that the target application icon includes an extended display region, display, in the extended display region of the target application icon, a function control, account information, or an unread message of a target application corresponding to the target application icon. Based on a feature that a display size of a desktop application icon is variable, in a case that the target application icon includes the extended display region, the electronic device combines the application icon with the function control, the account information, or the unread message. In this way, in a case that the electronic device does not need to be triggered to display an application interface of a target application corresponding to the target application icon, a user can implement a corresponding function by performing an input on the target application information displayed in the extended display region of the target application icon.

Therefore, based on display of application information corresponding to an application icon in an extended display region of the application icon, a function control in an application can be directly displayed, the user can also conveniently perform quick interaction, and display space of the application icon is also fully utilized, so that functions of the application icon can be enriched.

Optionally, the display unit 106 is further configured to adjust a display size of the target application icon. A trigger condition for adjusting the display size of the target application icon includes: A first input performed by a user on the target application icon is received, where the first input is used for triggering an electronic device to adjust the display size of the target application icon; or the target application corresponding to the target application icon receives at least one notification message.

In this embodiment of this application, in a case that the user performs the first input on the target application icon displayed in the first display region, or the electronic device receives the target notification message through the target application corresponding to the target application icon, the electronic device may increase the display size of the target application icon displayed in the first display region, to display an enlarged target application icon in the second display region, so that the function control corresponding to the target application icon, the account information corresponding to the target application icon, or the unread message corresponding to the target application icon can be displayed on the target application icon with an increased display size. Based on a feature that a display size of a desktop application icon is variable, the user performs an input to trigger the electronic device to combine an original application icon with the function control and the account information, so that a function control in an application can be directly displayed through the target application icon, the user can also conveniently perform quick interaction, and display space of the application icon is also fully utilized, so that functions of the icon can be enriched.

The user input unit 107 is configured to receive a second input performed by a user on the extended display region.

The display unit 106 is further configured to display at least one function option of the target application in response to the second input.

The user input unit 107 is further configured to receive a third input performed by a user on a first function option of the at least one function option.

The display unit 106 is specifically configured to display the first function option in the extended display region in response to the third input.

In this embodiment of this application, the user may perform an input on the extended display region before the target application information is displayed in the extended display region, to trigger the electronic device to display the at least one function option of the target application corresponding to the target application icon, so that the user can perform an input on the first function option of the at least one function option, and the electronic device determines the first function option selected by the user as the target application information to be displayed in the extended display region, and displays the first function option in the extended display region. Therefore, the user can directly perform an input on the first function option on the desktop to trigger the electronic device to run the target function corresponding to the first function option. This extends functions of an application icon displayed on the electronic device.

The user input unit 107 is further configured to receive a fourth input performed by a user on the first function option.

The processor 110 is further configured to perform target processing on the target application in response to the fourth input, where the target processing is processing indicated by the first function option.

The display unit 106 is further configured to: in a case that a fifth input performed by a user on the extended display region is received, in response to the fifth input, clear the first function option displayed in the extended display region; or in a case that a sixth input performed by a user on the extended display region and a second function option of the at least one function option is received, in response to the sixth input, replace the first function option displayed in the extended display region with the second function option.

In this embodiment of this application, after the electronic device displays the first function option on the target application icon, the user may directly perform an input on the first function option displayed on the target application icon on the desktop. Therefore, based on different inputs, the electronic device may run the target function corresponding to the first function option, replace the first function option displayed on the target application icon, or clear the first function option displayed on the target application icon. In this way, the user can quickly trigger the electronic device to run the target function or adjust a function control identifier displayed on the target application icon. This improves flexibility of displaying the target application information on the target application icon.

The user input unit 107 is further configured to receive a seventh input performed by a user on the extended display region.

The display unit 106 is further configured to: in response to the seventh input, display at least one piece of account information corresponding to the target application.

The user input unit 107 is further configured to receive an eighth input performed by a user on target account information of the at least one piece of account information.

The display unit 106 is further configured to display the target account information in the extended display region in response to the eighth input.

In this embodiment of this application, the user may perform an input on the extended display region before the target application information is displayed in the extended display region, to trigger the electronic device to display the at least one piece of account information corresponding to the target application icon, so that the user can perform an input on the target account information of the at least one piece of account information, and the electronic device determines the target account information selected by the user as the target application information to be displayed on the target application icon, and displays the target account information and the account login record on the target application icon. Therefore, the user can directly perform an input on the target account information on the desktop to trigger the electronic device to directly run the target application corresponding to the target application icon by using the target account information. This increases a speed of running, by the electronic device, the target application corresponding to the target application icon.

The user input unit 107 is further configured to receive a ninth input performed by a user on the target account information.

The processor 110 is further configured to: in response to the ninth input, log in by using a target account for the target application based on the target account information, where the target account is a login account associated with the target account information.

In this embodiment of this application, after the electronic device displays the target account information on the target application icon, the user may directly perform an input on the target account information displayed on the target application icon on the desktop. Therefore, based on different inputs, the electronic device may run the target application corresponding to the target application icon by using the target account information, replace the target account information displayed on the target application icon, or clear the target account information and the account login record displayed on the target application icon. In this way, the user can quickly trigger the electronic device to run the target application corresponding to the target application icon by using the target account information, or adjust account information displayed on the target application icon. This improves flexibility of displaying the target application information on the target application icon. In addition, the user can directly perform an operation on an extended display region of an application icon to implement one-tap login for different accounts without complex operations of first triggering the electronic device to enter an application interface and then selecting an account login option to select a login account, and the like. This can simplify an operation performed by the user.

The display unit 106 is specifically configured to: in a case that the target application corresponding to the target application icon receives at least one notification message, display the at least one notification message in the extended display region.

The user input unit 107 is further configured to receive a tenth input performed by a user on a target notification message of the at least one notification message.

The display unit 106 is further configured to: in response to the tenth input, display a target window, and clear the target notification message displayed in the extended display region, where the target window includes a target interface, and the target interface is a program interface including message content of the target notification message.

In this embodiment of this application, in a case that the electronic device receives the at least one notification message through the target application corresponding to the target application icon, the electronic device may display the at least one notification message in the extended display region of the target application icon. Therefore, in a case that the electronic device displays the desktop, the user can directly perform an input on the at least one notification message displayed in the extended display region, so that the electronic device can directly display the target window on the desktop and display detailed information of the at least one notification message in the target window, without first triggering the electronic device to display an interface of the target application and then displaying the detailed information of the target unread message. This improves efficiency of displaying the unread message by the electronic device.

The processor 110 is further configured to detect whether icon positions adjacent to the target application icon include an empty icon position.

The display unit 106 is further configured to: in a case that the icon positions adjacent to the target application icon include at least one empty icon position, adjust the display size of the target application icon based on a location of the empty icon position.

In this embodiment of this application, before adjusting the display size of the target application icon, the electronic device may first detect whether the icon positions adjacent to the target application icon include an empty icon position, and in a case that the icon positions adjacent to the target application icon include an empty icon position, adjust the display size of the target application icon based on a display location of the empty icon position, so that whether the display size of the target application icon can be adjusted can be accurately determined.

The display unit 106 is specifically configured to display the first account information in the first extended display region, and display the second account information in the second extended display region.

The display unit 106 is further configured to: in a case that a first message sent by a first contact associated with the first account information is received, and a second message sent by a second contact associated with the second account information is received, display the first message in the first extended display region, and displays the second message in the second extended display region, where the first extended display region is associated with the first account, and the second extended display region is associated with the second account.

In this embodiment of this application, the electronic device may display the first account information in the first extended display region and display the second account information in the second extended display region. Therefore, in a case that the first message sent by the first contact associated with the first account information is received, and the second message sent by the second contact associated with the second account information is received, the electronic device may display the first message in the first extended display region, and display the second message in the second extended display region. Therefore, the electronic device can receive messages sent by contacts corresponding to two pieces of different account information through the target application, and prompt the user, so that efficiency of receiving unread messages by the electronic device can be improved.

It should be understood that, in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or an on/off key), a trackball, a mouse, and a joystick. Details are not described herein. The memory 109 may be configured to store software programs and various data which include but are not limited to an application program and an operating system. The processor 110 may integrate an application processor and a modem processor. The application processor mainly processes an operating system, a user interface, an application program, and the like. The modem processor mainly processes wireless communication. It can be understood that the modem processor may alternatively not be integrated in the processor 110.

An embodiment of this application further provides a readable storage medium. The readable storage medium stores a program or instructions. When the program or instructions are executed by a processor, the processes of the foregoing display control method embodiments are implemented, with the same technical effects achieved. To avoid repetition, details are not described herein again.

The processor is a processor in the electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions, to implement the processes of the foregoing display control method embodiments, with the same technical effects achieved. To avoid repetition, details are not described herein again.

It should be understood that the chip provided in this embodiment of this application may also be referred to as a system-level chip, a system on chip, a chip system, a system-on-a-chip, or the like.

It should be noted that, the terms "include", "comprise", or any other variation thereof in this specification are intended to cover a non-exclusive inclusion, so that a process, a method, an object, or an apparatus that includes a list of elements not only includes those elements but also includes other elements that are not expressly listed, or further includes elements inherent to such a process, method, object, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, a person skilled in the art can clearly understand that the methods in the foregoing embodiments may be implemented by using software in combination with a necessary common hardware platform, or certainly may be implemented by using hardware. However, in most cases, the former is a preferred implementation. Based on such an understanding, the technical solutions of this application essentially or the part contributing to the conventional technology may be implemented in a form of a computer software product. The computer software product may be stored in a storage medium (for example, a ROM/RAM, a magnetic disk, or a compact disc), and includes several instructions for instructing a terminal (which may be a mobile phone, a computer, a server, a network device, or the like) to perform the methods in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A display control method, wherein the method comprises:
    obtaining icon display information of a target application icon; and
    in a case that the icon display information is that the target application icon comprises an extended display region, displaying target application information in the extended display region, wherein the target application information is application information of a target application corresponding to the target application icon; and
    the target application information comprises at least one of the following: a function control, account information, and an unread message;
    wherein the target application information comprises the function control; and
    before the displaying target application information in the extended display region, the method further comprises:
    receiving a second input performed by a user on the extended display region;
    displaying at least one function option of the target application in response to the second input; and
    receiving a third input performed by a user on a first function option of the at least one function option; and
    the displaying target application information in the extended display region comprises:
    displaying the first function option in the extended display region in response to the third input.

2. The method according to claim 1, wherein after the obtaining icon display information of a target application icon, the method further comprises:
    adjusting a display size of the target application icon, wherein
    a trigger condition for adjusting the display size of the target application icon comprises:
    a first input performed by a user on the target application icon is received, wherein the first input is used for triggering an electronic device to adjust the display size of the target application icon; or
    the target application corresponding to the target application icon receives at least one notification message.

3. The method according to claim 1, wherein after the displaying the first function option in the extended display region, the method further comprises:
    receiving a fourth input performed by a user on the first function option; and
    performing target processing on the target application in response to the fourth input, wherein the target processing is processing indicated by the first function option.

4. The method according to claim 1, wherein after the displaying the first function option in the extended display region, the method further comprises:
    in a case that a fifth input performed by a user on the extended display region is received, in response to the fifth input, clearing the first function option displayed in the extended display region; and
    in a case that a sixth input performed by a user on the extended display region and a second function option of the at least one function option is received, in response to the sixth input, replacing the first function option displayed in the extended display region with the second function option.

5. The method according to claim 1, wherein the target application information comprises the account information; and before the displaying target application information in the extended display region, the method further comprises:
receiving a seventh input performed by a user on the extended display region;
in response to the seventh input, displaying at least one piece of account information corresponding to the target application; and
receiving an eighth input performed by a user on target account information of the at least one piece of account information; and
the displaying target application information in the extended display region comprises:
displaying the target account information in the extended display region in response to the eighth input.

6. The method according to claim 5, wherein after the displaying the target account information in the extended display region, the method further comprises:
receiving a ninth input performed by a user on the target account information; and
in response to the ninth input, logging in by using a target account for the target application based on the target account information, wherein the target account is a login account associated with the target account information.

7. The method according to claim 1, wherein the target application information comprises the unread message;
the displaying target application information in the extended display region comprises:
in a case that the target application corresponding to the target application icon receives at least one notification message, displaying the at least one notification message in the extended display region; and
after the displaying target application information in the extended display region, the method further comprises:
receiving a tenth input performed by a user on a target notification message of the at least one notification message; and
in response to the tenth input, displaying a target window, and clearing the target notification message displayed in the extended display region, wherein
the target window comprises a target interface, and the target interface is a program interface comprising message content of the target notification message.

8. The method according to claim 2, wherein the adjusting a display size of the target application icon comprises:
detecting whether icon positions adjacent to the target application icon comprise an empty icon position; and
in a case that the icon positions adjacent to the target application icon comprise at least one empty icon position, adjusting the display size of the target application icon based on a location of the empty icon position.

9. The method according to claim 5, wherein the icon display information is that the target application icon comprises a first extended display region and a second extended display region; the target application information comprises first account information of a first account for the target application and second account information of a second account;
the displaying the target account information in the extended display region comprises:
displaying the first account information in the first extended display region, and displaying the second account information in the second extended display region; and
after the displaying the target account information in the extended display region, the method further comprises:
in a case that a first message sent by a first contact associated with the first account information is received, and a second message sent by a second contact associated with the second account information is received, displaying the first message in the first extended display region, and displaying the second message in the second extended display region, wherein
the first extended display region is associated with the first account, and the second extended display region is associated with the second account.

10. An electronic device, comprising a processor and a memory storing a program or an instruction that is capable of running on the processor, wherein the program or the instruction, when executed by the processor, causes the electronic device to perform:
obtaining icon display information of a target application icon; and
in a case that the icon display information is that the target application icon comprises an extended display region, displaying target application information in the extended display region, wherein the target application information is application information of a target application corresponding to the target application icon; and
the target application information comprises at least one of the following: a function control, account information, and an unread message;
wherein the target application information comprises the function control; and
before the displaying target application information in the extended display region, the program or the instruction, when executed by the processor, causes the electronic device to further perform:
receiving a second input performed by a user on the extended display region;
displaying at least one function option of the target application in response to the second input; and
receiving a third input performed by a user on a first function option of the at least one function option; and
when displaying target application information in the extended display region, the program or the instruction, when executed by the processor, causes the electronic device to further perform:
displaying the first function option in the extended display region in response to the third input.

11. The electronic device according to claim 10, wherein after the obtaining icon display information of a target application icon, the program or the instruction, when executed by the processor, causes the electronic device to further perform:
adjusting a display size of the target application icon, wherein
a trigger condition for adjusting the display size of the target application icon comprises:
a first input performed by a user on the target application icon is received, wherein the first input is used for triggering an electronic device to adjust the display size of the target application icon; or
the target application corresponding to the target application icon receives at least one notification message.

12. The electronic device according to claim 10, wherein after the displaying the first function option in the extended display region, the program or the instruction, when executed by the processor, causes the electronic device to further perform:
  receiving a fourth input performed by a user on the first function option; and
  performing target processing on the target application in response to the fourth input, wherein the target processing is processing indicated by the first function option.

13. The electronic device according to claim 10, wherein after the displaying the first function option in the extended display region, the program or the instruction, when executed by the processor, causes the electronic device to further perform:
  in a case that a fifth input performed by a user on the extended display region is received, in response to the fifth input, clearing the first function option displayed in the extended display region; and
  in a case that a sixth input performed by a user on the extended display region and a second function option of the at least one function option is received, in response to the sixth input, replacing the first function option displayed in the extended display region with the second function option.

14. The electronic device according to claim 10, wherein the target application information comprises the account information; and
  before the displaying target application information in the extended display region, the program or the instruction, when executed by the processor, causes the electronic device to further perform:
  receiving a seventh input performed by a user on the extended display region;
  in response to the seventh input, displaying at least one piece of account information corresponding to the target application; and
  receiving an eighth input performed by a user on target account information of the at least one piece of account information; and
  when displaying target application information in the extended display region, the program or the instruction, when executed by the processor, causes the electronic device to further perform:
  displaying the target account information in the extended display region in response to the eighth input.

15. The electronic device according to claim 14, wherein after the displaying the target account information in the extended display region, the program or the instruction, when executed by the processor, causes the electronic device to further perform:
  receiving a ninth input performed by a user on the target account information; and
  in response to the ninth input, logging in by using a target account for the target application based on the target account information, wherein the target account is a login account associated with the target account information.

16. The electronic device according to claim 10, wherein the target application information comprises the unread message;
  when displaying target application information in the extended display region, the program or the instruction, when executed by the processor, causes the electronic device to further perform:
  in a case that the target application corresponding to the target application icon receives at least one notification message, displaying the at least one notification message in the extended display region; and
  after the displaying target application information in the extended display region, the program or the instruction, when executed by the processor, causes the electronic device to further perform:
  receiving a tenth input performed by a user on a target notification message of the at least one notification message; and
  in response to the tenth input, displaying a target window, and clearing the target notification message displayed in the extended display region, wherein
  the target window comprises a target interface, and the target interface is a program interface comprising message content of the target notification message.

17. The electronic device according to claim 11, wherein when adjusting a display size of the target application icon, the program or the instruction, when executed by the processor, causes the electronic device to further perform:
  detecting whether icon positions adjacent to the target application icon comprise an empty icon position; and
  in a case that the icon positions adjacent to the target application icon comprise at least one empty icon position, adjusting the display size of the target application icon based on a location of the empty icon position.

18. The electronic device according to claim 14, wherein the icon display information is that the target application icon comprises a first extended display region and a second extended display region; the target application information comprises first account information of a first account for the target application and second account information of a second account;
  when displaying the target account information in the extended display region, the program or the instruction, when executed by the processor, causes the electronic device to further perform:
  displaying the first account information in the first extended display region, and displaying the second account information in the second extended display region; and
  after the displaying the target account information in the extended display region, the program or the instruction, when executed by the processor, causes the electronic device to further perform:
  in a case that a first message sent by a first contact associated with the first account information is received, and a second message sent by a second contact associated with the second account information is received, displaying the first message in the first extended display region, and displaying the second message in the second extended display region, wherein
  the first extended display region is associated with the first account, and the second extended display region is associated with the second account.

\* \* \* \* \*